US008784192B2

(12) United States Patent
Gagner et al.

(10) Patent No.: US 8,784,192 B2
(45) Date of Patent: *Jul. 22, 2014

(54) MANAGING LIMITATION RULES FOR WAGERING ACCOUNTS

(71) Applicant: WMS Gaming, Inc., Waukegan, IL (US)

(72) Inventors: Mark B. Gagner, West Chicago, IL (US); Erhard W. Rathsack, Reno, NV (US); Alfred Thomas, Las Vegas, NV (US)

(73) Assignee: WMS Gaming, Inc., Waukegan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/858,467

(22) Filed: Apr. 8, 2013

(65) Prior Publication Data

US 2013/0225273 A1    Aug. 29, 2013

Related U.S. Application Data

(63) Continuation of application No. 12/991,391, filed as application No. PCT/US2009/043055 on May 6, 2009, now Pat. No. 8,439,746.

(60) Provisional application No. 61/051,145, filed on May 7, 2008.

(51) Int. Cl.
*A63F 9/24* (2006.01)
*A63F 13/00* (2014.01)
*G06F 17/00* (2006.01)
*G06F 19/00* (2011.01)

(52) U.S. Cl.
USPC ............. 463/25; 463/16; 463/40; 463/42; 705/39; 902/23

(58) Field of Classification Search
USPC ............. 463/16, 25, 42, 40; 705/39; 902/23
See application file for complete search history.

(56) References Cited

U.S. PATENT DOCUMENTS

| 4,240,635 A | 12/1980 | Brown |
| 4,283,709 A | 8/1981 | Lucero et al. |
| 4,335,809 A | 6/1982 | Wain |

(Continued)

FOREIGN PATENT DOCUMENTS

| EP | 0769769 | 4/1997 |
| JP | 10192537 | 7/1998 |

(Continued)

OTHER PUBLICATIONS

U.S. Appl. No. 13/437,657, filed Apr. 2, 2012, Agarwal, Vijay K., et al.

(Continued)

*Primary Examiner* — Adetokynbo O Torimiro
(74) *Attorney, Agent, or Firm* — DeLizio Gilliam, PLLC

(57) ABSTRACT

A wagering game account management system and its operations are described herein. In some embodiments, the operations include assigning one or more money values to a graphical user interface control and linking the graphical user interface control to a credit account. The credit account is a third-party financial account from which a player account is authorized to borrow funds up to a credit limit. In some embodiments, the operations further include providing the graphical user interface control for presentation during a wagering game session associated with the player account.

20 Claims, 16 Drawing Sheets

(56) References Cited

U.S. PATENT DOCUMENTS

| | | |
|---|---|---|
| 4,339,798 A | 7/1982 | Hedges et al. |
| 4,359,631 A | 11/1982 | Lockwood et al. |
| 4,467,424 A | 8/1984 | Hedges et al. |
| 4,494,197 A | 1/1985 | Troy et al. |
| 4,575,622 A | 3/1986 | Pellegrini |
| 4,636,951 A | 1/1987 | Harlick |
| 4,648,600 A | 3/1987 | Olliges |
| 4,669,730 A | 6/1987 | Small |
| 4,760,527 A | 7/1988 | Sidley |
| 4,815,741 A | 3/1989 | Small |
| 4,842,278 A | 6/1989 | Markowicz |
| 4,856,787 A | 8/1989 | Itkis |
| 4,880,237 A | 11/1989 | Kishishita |
| 4,882,473 A | 11/1989 | Bergeron et al. |
| 4,926,327 A | 5/1990 | Sidley |
| 4,994,908 A | 2/1991 | Kuban et al. |
| 5,038,022 A | 8/1991 | Lucero |
| 5,069,453 A | 12/1991 | Koza et al. |
| 5,119,295 A | 6/1992 | Kapur |
| 5,159,549 A | 10/1992 | Hallman, Jr. et al. |
| 5,179,517 A | 1/1993 | Sarbin et al. |
| 5,197,094 A | 3/1993 | Tillery et al. |
| 5,223,698 A | 6/1993 | Kapur |
| 5,259,613 A | 11/1993 | Marnell, II |
| 5,265,874 A | 11/1993 | Dickinson et al. |
| 5,276,312 A | 1/1994 | McCarthy |
| 5,287,269 A | 2/1994 | Dorrough et al. |
| 5,297,802 A | 3/1994 | Pocock et al. |
| 5,324,035 A | 6/1994 | Morris et al. |
| 5,326,104 A | 7/1994 | Pease et al. |
| 5,332,076 A | 7/1994 | Ziegert |
| 5,371,345 A | 12/1994 | LeStrange et al. |
| 5,408,417 A | 4/1995 | Wilder |
| 5,429,361 A | 7/1995 | Raven et al. |
| 5,457,306 A | 10/1995 | Lucero |
| 5,470,079 A | 11/1995 | LeStrange et al. |
| 5,505,449 A | 4/1996 | Eberhardt et al. |
| 5,524,888 A | 6/1996 | Heidel |
| 5,559,312 A | 9/1996 | Lucero |
| 5,581,461 A | 12/1996 | Coll et al. |
| 5,586,937 A | 12/1996 | Menashe |
| 5,611,730 A | 3/1997 | Weiss |
| 5,613,912 A | 3/1997 | Slater |
| 5,655,961 A | 8/1997 | Acres et al. |
| 5,674,128 A | 10/1997 | Holch et al. |
| 5,722,890 A | 3/1998 | Libby et al. |
| 5,732,398 A | 3/1998 | Tagawa |
| 5,755,621 A | 5/1998 | Marks et al. |
| 5,761,647 A | 6/1998 | Boushy |
| 5,762,552 A | 6/1998 | Vuong et al. |
| 5,770,533 A | 6/1998 | Franchi |
| 5,797,794 A | 8/1998 | Angell |
| 5,800,269 A | 9/1998 | Holch et al. |
| 5,811,772 A | 9/1998 | Lucero |
| 5,823,879 A | 10/1998 | Goldberg et al. |
| 5,830,067 A | 11/1998 | Graves et al. |
| 5,830,068 A | 11/1998 | Brenner et al. |
| 5,830,069 A | 11/1998 | Soltesz et al. |
| 5,836,817 A | 11/1998 | Acres et al. |
| 5,857,911 A | 1/1999 | Fioretti |
| 5,871,398 A | 2/1999 | Schneier et al. |
| 5,917,725 A | 6/1999 | Thacher et al. |
| 5,919,091 A | 7/1999 | Bell et al. |
| 5,949,411 A | 9/1999 | Doerr et al. |
| 5,952,640 A | 9/1999 | Lucero |
| 5,959,277 A | 9/1999 | Lucero |
| 5,971,271 A | 10/1999 | Wynn et al. |
| 5,971,849 A | 10/1999 | Falciglia |
| 5,984,779 A | 11/1999 | Bridgeman et al. |
| 6,019,283 A | 2/2000 | Lucero |
| 6,024,640 A | 2/2000 | Walker et al. |
| 6,039,648 A | 3/2000 | Guinn et al. |
| 6,048,269 A | 4/2000 | Burns et al. |
| 6,049,823 A | 4/2000 | Hwang |
| 6,089,982 A | 7/2000 | Holch et al. |
| 6,093,100 A | 7/2000 | Singer et al. |
| 6,101,477 A | 8/2000 | Hohle et al. |
| 6,110,041 A | 8/2000 | Walker et al. |
| 6,113,495 A | 9/2000 | Walker et al. |
| 6,120,024 A | 9/2000 | Lind |
| 6,141,006 A | 10/2000 | Knowlton et al. |
| 6,168,522 B1 | 1/2001 | Walker et al. |
| 6,183,366 B1 | 2/2001 | Goldberg et al. |
| 6,247,643 B1 | 6/2001 | Lucero |
| 6,264,560 B1 | 7/2001 | Goldberg et al. |
| 6,280,326 B1 | 8/2001 | Saunders |
| 6,280,328 B1 | 8/2001 | Holch et al. |
| 6,319,125 B1 | 11/2001 | Acres |
| 6,322,446 B1 | 11/2001 | Yacenda |
| 6,347,086 B1 | 2/2002 | Strachan |
| 6,358,151 B1 | 3/2002 | Enzminger et al. |
| 6,383,078 B1 | 5/2002 | Yacenda |
| 6,409,602 B1 | 6/2002 | Wiltshire et al. |
| 6,471,590 B2 | 10/2002 | Saunders |
| 6,508,709 B1 | 1/2003 | Karmarkar |
| 6,629,890 B2 | 10/2003 | Johnson |
| 7,022,017 B1 | 4/2006 | Halbritter et al. |
| 7,128,652 B1 | 10/2006 | Lavoie et al. |
| 2001/0003100 A1 | 6/2001 | Yacenda |
| 2001/0031663 A1 | 10/2001 | Johnson |
| 2002/0002075 A1 | 1/2002 | Rowe |
| 2002/0028709 A1 | 3/2002 | Finer et al. |
| 2002/0077178 A1 | 6/2002 | Oberberger et al. |
| 2002/0111213 A1 | 8/2002 | McEntee et al. |
| 2002/0147047 A1 | 10/2002 | Letovsky et al. |
| 2002/0166126 A1 | 11/2002 | Pugh et al. |
| 2003/0027631 A1 | 2/2003 | Hedrick et al. |
| 2003/0054868 A1 | 3/2003 | Paulsen et al. |
| 2003/0100371 A1 | 5/2003 | Gatto et al. |
| 2003/0104863 A1 | 6/2003 | Park |
| 2003/0212636 A1 | 11/2003 | Resnick |
| 2003/0224854 A1 | 12/2003 | Joao |
| 2004/0084524 A1 | 5/2004 | Ramachandran |
| 2004/0102238 A1 | 5/2004 | Taylor |
| 2004/0121841 A1 | 6/2004 | Xidos et al. |
| 2004/0147313 A1 | 7/2004 | Stanley et al. |
| 2004/0231018 A1 | 11/2004 | Olson |
| 2005/0020354 A1 | 1/2005 | Nguyen et al. |
| 2005/0064938 A1 | 3/2005 | Xidos et al. |
| 2005/0101383 A1 | 5/2005 | Wells |
| 2005/0107156 A1 | 5/2005 | Potts et al. |
| 2005/0187012 A1 | 8/2005 | Walker et al. |
| 2006/0100009 A1 | 5/2006 | Walker et al. |
| 2006/0121972 A1 | 6/2006 | Walker et al. |
| 2006/0121979 A1 | 6/2006 | Kennard et al. |
| 2006/0154722 A1 | 7/2006 | Walker et al. |
| 2006/0211493 A1 | 9/2006 | Walker et al. |
| 2007/0015573 A1 | 1/2007 | Angell et al. |
| 2007/0167209 A1 | 7/2007 | Jaffe et al. |
| 2007/0259714 A1 | 11/2007 | Block et al. |
| 2011/0077073 A1 | 3/2011 | Gagner et al. |
| 2011/0201408 A1 | 8/2011 | Gagner et al. |
| 2011/0245943 A1 | 10/2011 | Agarwal et al. |
| 2012/0190437 A1 | 7/2012 | Agarwal et al. |
| 2013/0172075 A1 | 7/2013 | Gagner et al. |
| 2013/0296027 A1 | 11/2013 | Gagner et al. |

FOREIGN PATENT DOCUMENTS

| | | |
|---|---|---|
| JP | 200245557 | 2/2002 |
| JP | 2002210186 | 7/2002 |
| JP | 2005118431 | 5/2005 |
| JP | 200687714 | 4/2006 |
| JP | 2006116244 | 5/2006 |
| WO | WO9530944 | 11/1995 |
| WO | WO8906998 | 8/1998 |
| WO | WO0176710 | 10/2001 |
| WO | WO03045517 | 5/2003 |
| WO | WO2007107883 | 9/2007 |
| WO | WO-2008058279 | 5/2008 |
| WO | WO-2009137633 | 11/2009 |
| WO | WO-2010054027 | 5/2010 |

(56) References Cited

FOREIGN PATENT DOCUMENTS

OTHER PUBLICATIONS

U.S. Appl. No. 13/777,357, filed Feb. 26, 2013, Gagner, Mark B., et al.
U.S. Appl. No. 13/858,467, filed Apr. 8, 2013, Gagner, Mark B., et al.
U.S. Appl. No. 13/926,869, filed Jun. 25, 2013, Gagner, Mark B., et al.
"19- Touchscreen Multi-Game Terminal Supergold Bingo Play Description", *Pot-O-Gold* before Aug. 31, 2007 , 2 pages.
"19 Touchscreen Multi-Game Terminal Superpick Lotto Play Description", *Pot-O-Gold* before Aug. 31, 2007, 2 pages.
"19 Touchscreen Multi-Game Terminal Touch 6 Lotto Play Description" *Pot-O-Gold* before Aug. 31, 2007 , 2 pages.
"19 Touchscreen Multi-Game Terminal Touch 6 Lotto Technical Description", *Pot-O-Gold* before Aug. 31, 2007 , 1 page.
"19 Touchscreen Multi-Game Terminal Toucheasy Keno Play Description", *Pot-O-Gold* before Aug. 31, 2007 , 2 pages.
"Amendment in the Nature of a Substitute H.R. 3125, Offered by Mr. Goodlatte of Virginia", *Tech Law Journal* www.techlawjournal.com Date obtained from the Internet Dec. 20, 2005 Apr. 5, 2000 , 3 pages.
"*AT&T Corp. v. Coeur D'Alene Tribe*, 45 F. Supp. 2d 995 (D. Idaho 1998)", 1998 , 14 pages.
"Bill HR 3125 IH The Internet Gambling Prohibition Art Dec. 21, 1999", Oct. 21, 1999 , 17 pages.
"Casino Systems Solutions", *IGT International Game Technology* Mar. 19, 1997, 20 pages.
"CDS Video Slant Top", *Casino Data Systems* before Aug. 31, 2007 , 6 pages.
"Examination Report", Sep. 17, 2009 , 3 pages.
"H.R. 3125, 106th Congress, 2d Session", *Internet Prohibition Act of 2000* http://thomas.loc.gov Date obtained from the Internet: Nov. 23, 2005 Oct. 21, 1999 , 9 pages.
"High-Tech Gambling Debuts at Turning Stone" *Syracuse Post Standard* Feb. 27, 1995 , 1 page.
"Oasis II", *CDS Systems and Services* before Aug. 31, 2007 , 8 pages.
"PCT Application No. PCT/US09/43055 International Preliminary Report on Patentability", Jun. 21, 2010 , 14 pages.
"PCT Application No. PCT/US09/43055 International Search Report", Jun. 22, 2009 , 10 pages.
"PCT Application No. PCT/US09/63321 International Preliminary Report on Patentability", Oct. 5, 2010 , 9 pages.
"PCT Application No. PCT/US09/63321 International Search Report", Dec. 29, 2009 , 8 pages.
"PCT Application No. PCT/US2007/084316 International Preliminary Report on Patentability", Jan. 13, 2009 , 8 pages.
"PCT Application No. PCT/US2007/084316 International Search Report and Written Opinion", May 23, 2008 , 10 pages.
"S. 692, 106th Congress, 1st Session", *Internet Gambling Prohibition Act of 1999* before Aug. 31, 2007 , 8 pages.
"Singapore Application 0800336-0 IPO of Singapore Written Opinion", Feb. 25, 2009 , 7 pages.
"The Future of Gaming Today", *Casino Data Systems* before Aug. 31, 2007 , 6 pages.
"U.S. Appl. No. 11/483,558 Office Action", Jun. 24, 2009 , 9 pages.
"U.S. Appl. No. 12/513,486 Office Action", Oct. 11, 2012 , 13 pages.
"U.S. Appl. No. 12/513,486 Office Action", Feb. 23, 2012 , 36 pages.
"U.S. Appl. No. 12/991,391 Office Action", Mar. 12, 2012 , 29 pages.
Banks, Michael A. , "America Online: A Graphics-Based Success" *Link-Up* Jan./Feb. 1992 , pp. 12, 14 and 15.
Conti, Carl , "Letter to Bruce T. Samboy", Jun. 27, 1994 , 2 pages.
Corbisiero, Jr., Richard F. , "Letter to Niels C. Holch", Jul. 14, 1994 , 1 page.
Gatley, Susan , "Turning Stone Inter-Office Memorandum to Bong Woo", re Instant Keno Issues Oct. 17, 1994 , 3 pages.
Green, Marian , "Cashing in", *Indian Gaming Business* Fall 2006 , 21-23.
Grochowski, John , "The Cashless Puzzle", *Slot Manager* Jan./Feb. 2008 , 5 pages.
Holch, Niels C. , "Letter to Hon. Richard F. Corbisiero, Jr.", Jul. 12, 1994 , 1 page.
Imagineering Systems, Inc., , "Instant Keno—Cashless Automated Keno Writer Stations", before Aug. 31, 2007 , 7 pages.
Imagineering Systems, Inc., , "Instant Keno Specification", multiple drafts captioned "Keno" and "Instant Keno," undated before Aug. 31, 2007 , 38 pages.
Imagineering Systems, Inc., , "The Keno People", before Aug. 31, 2007 , 2 pages.
Mikohn Worldwide, , "A Revolution for Table Games" *SafeJack* before Aug. 31, 2007 , 15 pages.
Mikohn Worldwide, , "CasinoLink System", before Aug. 31, 2007 , 8 pages.
Mikohn Worldwide, , "What is Casinolink", *Casinolink* before Aug. 31, 2007 , 4 pages.
Minder, Jacqueline L. , "Letter to Ron Mach", Jun. 20, 1994 , 1 page.
Monteau, Harold , "Letter to Richard M. Milanovich", *National Indiam Gaming Commission* Jun. 6, 1995 , 2 pages.
Monteau, Harold A. , "Semiannual Regulatory Agenda" *National Gaming Indian Commission* Obtained from the Internet: Feb. 26, 2007 before Feb. 26, 2007 , 1 page.
Quick Track Gaming, Inc., , "QuickTrack", before Mar. 18, 1997 , 44 pages.
Samboy, Bruce T. , "Letter to Carl Conti", Jun. 13, 1994 , 2 pages.
Samboy, Bruce T. , "Letter to Carl Conti", Jul. 1, 1994 , 2 pages.
Samboy, Bruce T. , "Letter to Hon. Richard F. Corbisiero, Jr.", Jun. 1, 1994 , 7 pages.
Samboy, Bruce T. , "Letter to Hon. Richard F. Corbisiero, Jr.", Jun. 14, 1994 , 8 pages.
Smith, Katherine A. , "Letter to Hon. James R. Hurley", Jun. 15, 1994 , 4 pages.
Washburn, Kevin K. , "WIN Sports Betting", Mar. 13, 2001 , 3 pages.
Yerak, Becky , "At Cashless Slots: You've got mail, and a jackpot No more coins to insert, but you can get messages", *USA Today* Nov. 13, 2000 , 4 pages.
"U.S. Appl. No. 13/437,657 Office Action", Feb. 11, 2014 , 6 Pages.

| ACCOUNT RULES | | | | | |
|---|---|---|---|---|---|
| | | | | ADD NEW RULE — 804 | |
| ACTION | AMOUNT | SOURCE ACCOUNT | DESTINATION ACCOUNT | TRIGGER | 806 |
| TRANSFER | $200.00 | CHECKING ACCOUNT | CASINO ACCOUNT | EVERY DAY AT 12:00 AM | 808 |
| TRANSFER | 1% | GAME SESSION ACCOUNT | CHARITY ACCOUNT | UPON CASH-OUT EVENT | 810 |
| TRANSFER | $100.00 | CASINO ACCOUNT | MONEY MARKET | SOURCE ACCOUNT > $200.00 | 812 |
| LOCK | | CASINO ACCOUNT | | SOURCE ACCOUNT HAS REDUCED BY 50% IN LESS THAN AN HOUR | 814 |
| LOCK | | CASINO AND MONEY MARKET ACCTS | | EVERY DAY BETWEEN 3:00AM AND 7:00AM | 816 |
| RECEIVE ONLY | | MONEY MARKET ACCOUNT | | ALWAYS | 818 |

MANAGING LIMITATION RULES FOR WAGERING ACCOUNTS

RELATED APPLICATIONS

This application is a continuation of U.S. application Ser. No. 12/991,391 which is a National Stage of International Application No. PCT/US09/43055 filed 6 May 2009. The PCT/US09/43055 application claims priority to U.S. Provisional Application No. 61/051,145 filed 7 May 2008. application Ser. No. 12/991,391, International Application PCT/US09/43055, and U.S. Provisional Application No. 61/051,145 are hereby incorporated by reference.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2008, WMS Gaming, Inc.

FIELD

Embodiments of the inventive subject matter relate generally to wagering game systems, and more particularly to managing and enforcing limitation rules for wagering accounts.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

The present invention is illustrated by way of example and not limitation in the Figures of the accompanying drawings in which:

FIG. 8 is a block diagram illustrating an account rules interface, according to example embodiments of the invention;

DESCRIPTION OF THE EMBODIMENTS

This description of the embodiments is divided into six sections. The first section provides an introduction to embodiments of the invention, while the second section describes wagering game machine architectures and wagering game networks. The third section describes interfaces and operations of some embodiments and the fourth section describes example wagering game machines in more detail. The fifth section describes some additional embodiments and the sixth section presents some general comments.

Introduction

This section provides an introduction to some embodiments of the invention.

Wagering game machines typically offer a limited number of ways for players to provide monetary value for use in wagering games. Some wagering game machines allow players to insert cash and cashless vouchers or to draw from casino accounts. However, wagering game machines typically do not offer many other ways to procure funds. As a result, when players run out of cash, cashless vouchers, and/or casino account funds, they often leave the casino floor to acquire additional funds. For example, players may go to automated teller machines, banks, or other institutions from which they can procure funds. Some embodiments of the invention enable players to acquire funds from a variety of sources without leaving a wagering game machine. Additionally, some embodiments enable players to specify conditions under which various account transactions will take place. For example, players can create account rules that automatically replenish depleted accounts, limit losses, donate a portion of winnings to charity, etc. The discussion of FIG. 1 describes some of these embodiments in more detail.

Figure 1:
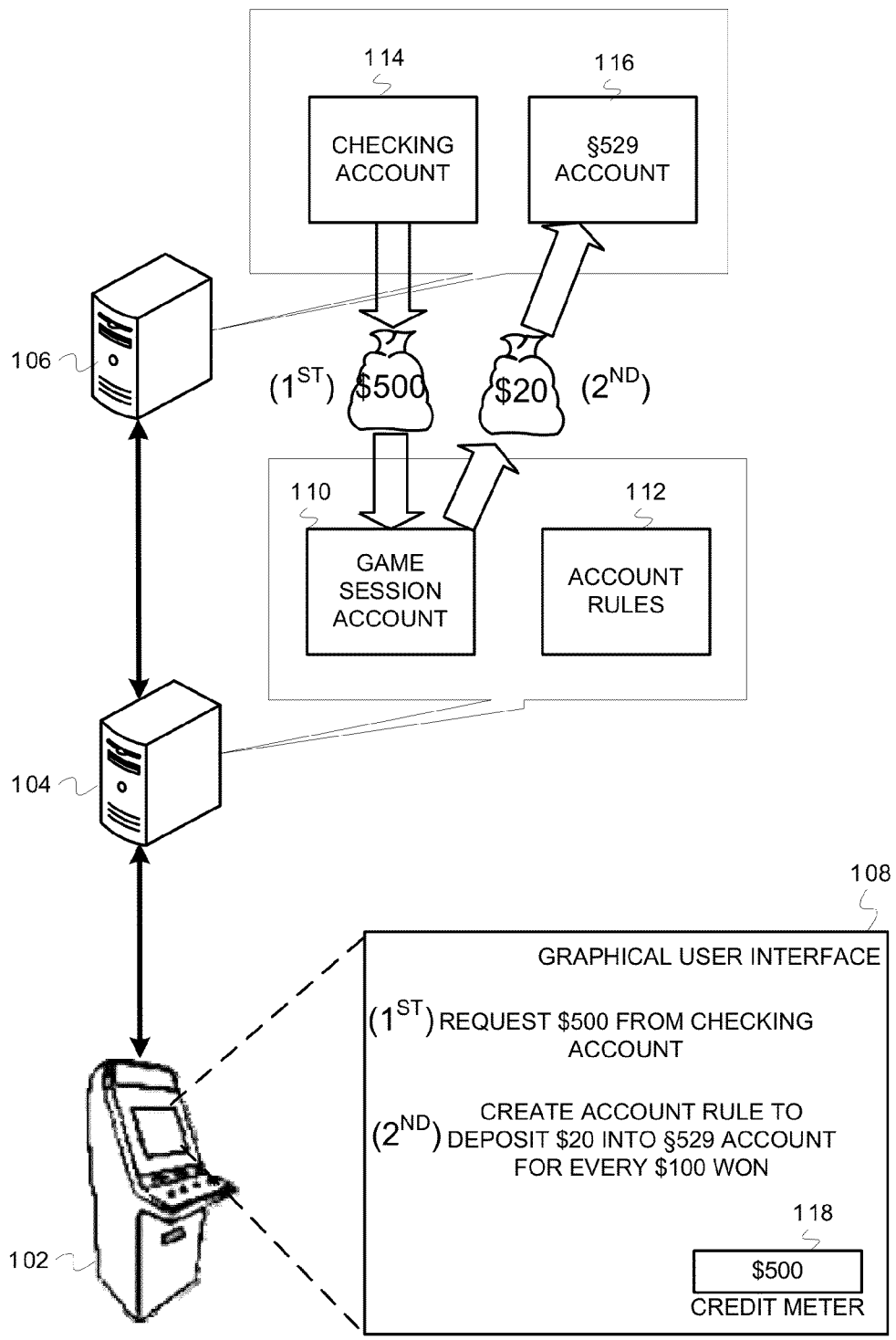
FIG. 1 is a block diagram illustrating account transactions, according to example embodiments of the invention.

FIG. 1 is a block diagram illustrating account transactions, according to example embodiments of the invention. In FIG. 1, a wagering game machine 102 is connected to an account controller 104, which is connected to a financial institution computer 106. The wagering game machine 102 provides a graphical user interface 108 through which players request account transactions and create account rules. The account server 104 facilitates the account transactions and enforces the account rules, while the financial institution computer 106 also facilitates account transactions.

FIG. 1 shows two transactions. In the first transaction (see "1$^{ST}$" in FIG. 1) a player (not shown) uses the interface 114 to request transfer of $500 from a checking account 114 to a game session account 110. After the wagering game machine 102 receives the player's request, the machine 102 notifies the account controller 104 about the request. As a result, the account controller 104 contacts the financial institution computer 106, which transfers $500 from the player's checking account 114 to the player's game session account 110. Funds in the game session account 110 appear on the wagering game machine's credit meter 118 and are available for use in wagering games presented on the wagering game machine 102.

In the second transaction (see "2$^{ND}$" in FIG. 1), the player configures an account rule in the user interface 108. The account rule prompts transfer of $20 from the player's game session account 110 to his §529 account 116 for every $100 won playing wagering games. For information about §529 accounts, see section 529 of the United States Code, which governs Qualified State Tuition Programs. The wagering game machine 102 notifies the account controller 104 about the account rule. The wagering game machine 102 also notifies the account controller 104 whenever the player wins money playing wagering games. When the player's winnings reach $100, the account controller 104 transfers $20 from the game session account 110 to the §529 account 116. The account controller 104 can support other account rules. In some embodiments, account rules can transfer a percentage of winnings from the game session account 110 to the §529 account 116. For example, if a player win ten cents in a single game, twenty percent (two cents) is transferred into the §529 account 116.

Although FIG. 1 describes some embodiments, the following sections describe many other features and embodiments.

Example Operating Environment

This section describes an example operating environment and provides structural aspects of some embodiments. This section includes discussion about wagering game machine architectures and wagering game networks.

Wagering Game Machine Architecture

Figure 2:
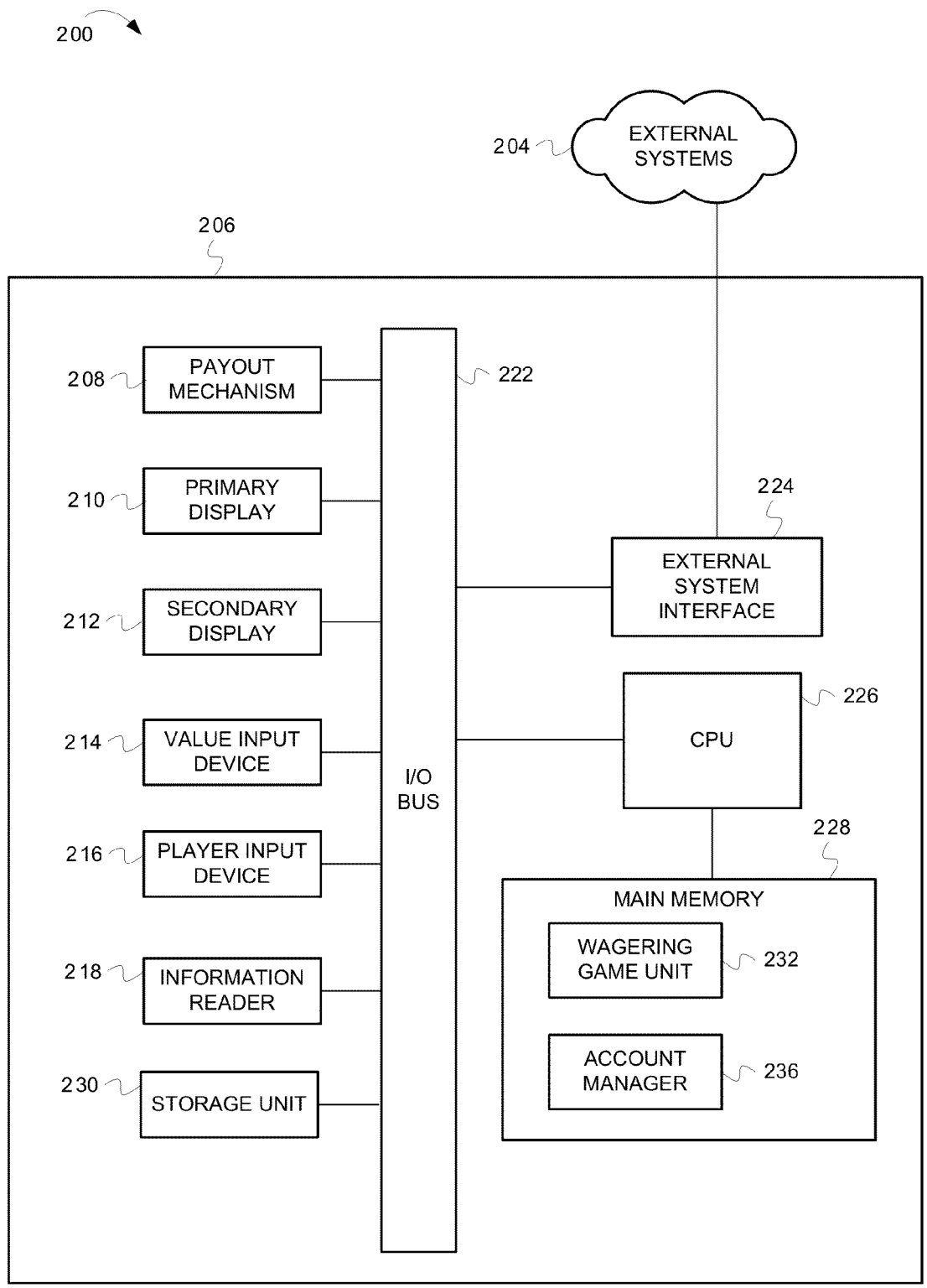
FIG. 2 is a block diagram illustrating a wagering game machine architecture, according to example embodiments of the invention.

FIG. 2 is a block diagram illustrating a wagering game machine architecture, according to example embodiments of the invention. As shown in FIG. 2, the wagering game machine architecture 200 includes a wagering game machine cabinet 206, which includes a central processing unit (CPU) 226 connected to main memory 228. The CPU 226 can include any suitable processor, such as an Intel® Pentium III processor, Intel® Core 2 Duo processor, AMD Opteron™ processor, UltraSPARC processor, etc. The main memory 228 includes a wagering game unit 232 and an account manager 236. In some embodiments, the wagering game unit 232 can present wagering games, such as video poker, video black jack, video slots, video lottery, etc., in whole or part. In some embodiments, the account manager 236 provides a user interface through which players can request account transactions and configure account rules. For example, players can request funds transfers between various accounts, such as game session accounts, checking accounts, savings accounts, §529 accounts, charity accounts, etc. The account rules can cause transfers and other transactions to occur when specific conditions are met. For example, account rules can initiate funds transfers when players wager specific amounts, win specific amounts, play a specific number of wagering games, etc.

The CPU 226 is also connected to an input/output (I/O) bus 222, which can include any suitable bus technologies, such as an AGTL+frontside bus and a PCI backside bus. The I/O bus 222 is connected to a payout mechanism 208, primary display 210, secondary display 212, value input device 214, player input device 216, information reader 218, and storage unit 230. The player input device 216 can include the value input device 214 to the extent the player input device 216 is used to place wagers. The I/O bus 222 is also connected to an external system interface 224, which is connected to external systems 204 (e.g., wagering game networks).

In one embodiment, the wagering game machine 206 can include additional peripheral devices and/or more than one of each component shown in FIG. 2. For example, in one embodiment, the wagering game machine 206 can include multiple external system interfaces 224 and/or multiple CPUs 226. In one embodiment, any of the components can be integrated or subdivided.

Any component of the architecture 200 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Figure 3:
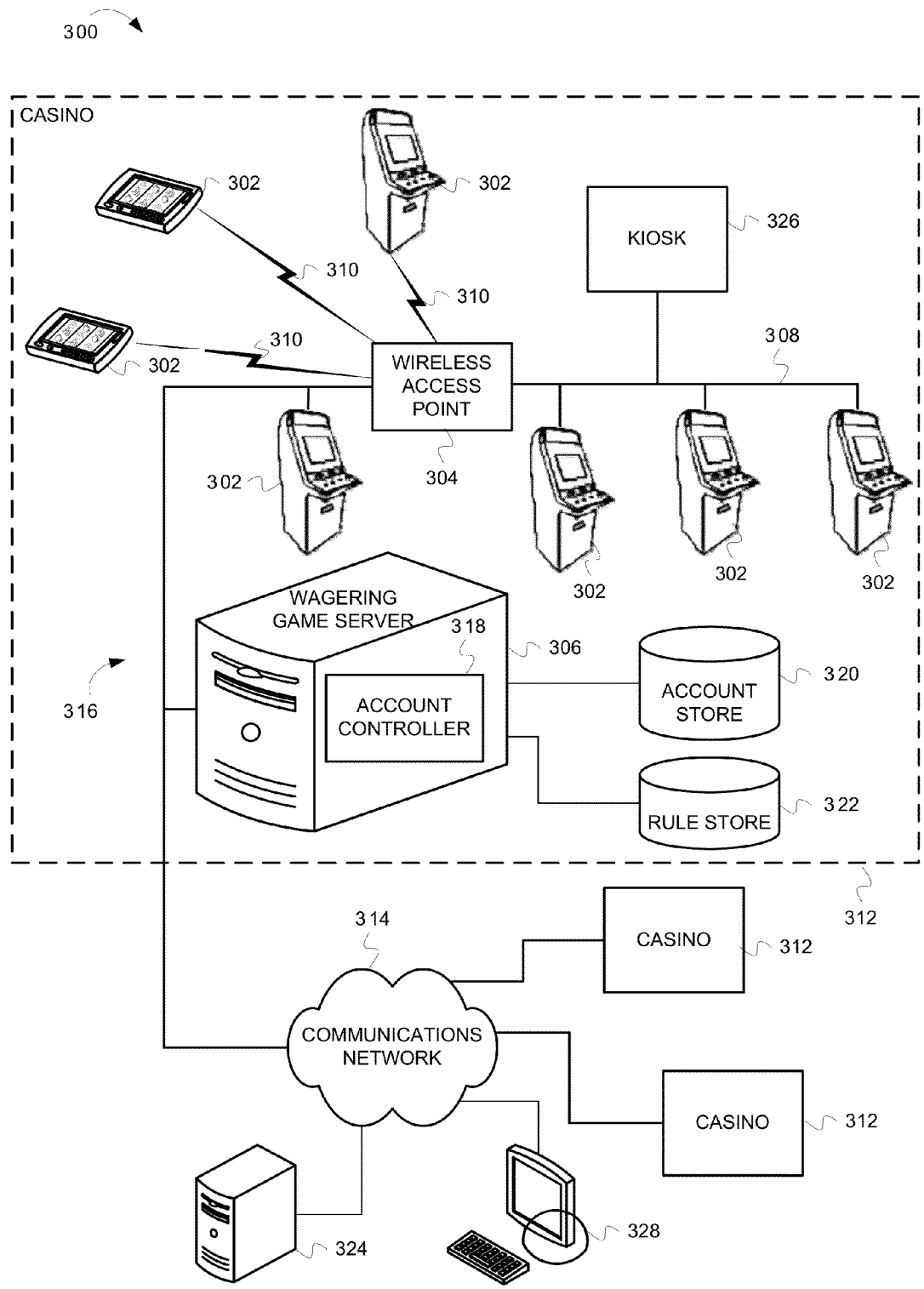
FIG. 3 is a block diagram illustrating a wagering game network 300, according to example embodiments of the invention.

While FIG. 2 describes example embodiments of a wagering game machine architecture, FIG. 3 shows how a plurality of wagering game machines can be connected in a wagering game network.

Wagering Game Network

FIG. 3 is a block diagram illustrating a wagering game network 300, according to example embodiments of the invention. As shown in FIG. 3, the wagering game network 300 includes a plurality of casinos 312 connected to a communications network 314.

Each of the plurality of casinos 312 includes a local area network 316, which may include a wireless access point 304, wagering game machines 302, and a wagering game server 306 that can serve wagering games over the local area network 316. The wagering game server 306 includes an account controller 318, which can facilitate account transactions and enforce account rules. The account controller 318 can communicate with other network components, such as the financial institution computer 324, when enforcing account rules and processing transactions. Also, the account controller 318 can record, modify, and use account information in the account store 320 and rule store 322. In some embodiments, the account controller 318, account store 320, and the rule store 322 can be located outside the casino 312.

The local area network 316 includes wireless communication links 310 and wired communication links 308. The wired and wireless communication links can employ any suitable connection technology, such as Bluetooth, 802.11, Ethernet, public switched telephone networks, SONET, USB, arcnet, current loop, etc. In one embodiment, the wagering game server 306 can serve wagering games and/or distribute content to devices located in other casinos 312 or at other locations on the communications network 314.

Any of the wagering game network components (e.g., the wagering game machines 302) can include hardware and machine-readable media including instructions for performing the operations described herein.

The wagering game machines 302 described herein can take any suitable form, such as floor standing models, handheld mobile units, bartop models, workstation-type console models, etc. Further, the wagering game machines 302 can be primarily dedicated for use in conducting wagering games, or can include non-dedicated devices, such as mobile phones, personal digital assistants, personal computers, etc. In one embodiment, the wagering game network 300 can include other network devices, such as accounting servers, wide area progressive servers, player tracking servers, and/or other devices suitable for use in connection with embodiments of the invention.

In various embodiments, wagering game machines 302 and wagering game servers 306 work together such that a wagering game machine 302 may be operated as a thin, thick, or intermediate client. For example, one or more elements of game play may be controlled by the wagering game machine 302 (client) or the wagering game server 306 (server). Game play elements may include executable game code, lookup tables, configuration files, game outcome, audio or visual representations of the game, game assets or the like. In a thin-client example, the wagering game server 306 may perform functions such as determining game outcome or managing assets, while the wagering game machine 302 may be used merely to present the graphical representation of such outcome or asset modification to the user (e.g., player). In a thick-client example, game outcome may be determined locally (e.g., at the wagering game machine 302) and then communicated to the wagering game server 306 for recording or managing a player's account.

Similarly, functionality not directly related to game play may be controlled by the wagering game machine 302 (client) or the wagering game server 306 (server) in embodiments. For example, account transactions and account rules may be managed centrally (e.g., by the wagering game server 306) or locally (e.g., by the wagering game machine 302). Other functionality not directly related to game play may include power management, presentation of advertising, software or firmware updates, system quality or security checks, etc.

Operations and Interfaces

This section describes operations and interfaces associated with some embodiments of the invention. In the discussion below, the flow diagrams will be described with reference to the block diagrams presented above. In certain embodiments, the operations are performed by executing instructions residing on machine-readable media (e.g., software), while in other embodiments, the operations are performed by hardware and/or other logic (e.g., firmware). In some embodiments, the operations are performed in series, while in other embodiments, one or more of the operations can be performed in parallel. Furthermore, the discussion below describes communications between wagering game network components. In some embodiments, the communications can include HyperText Transport Protocol (HTTP) requests for Hypertext Markup Language (HTML) documents. However, in other embodiments, the communications can be formatted according to different communication protocols.

Figure 4:
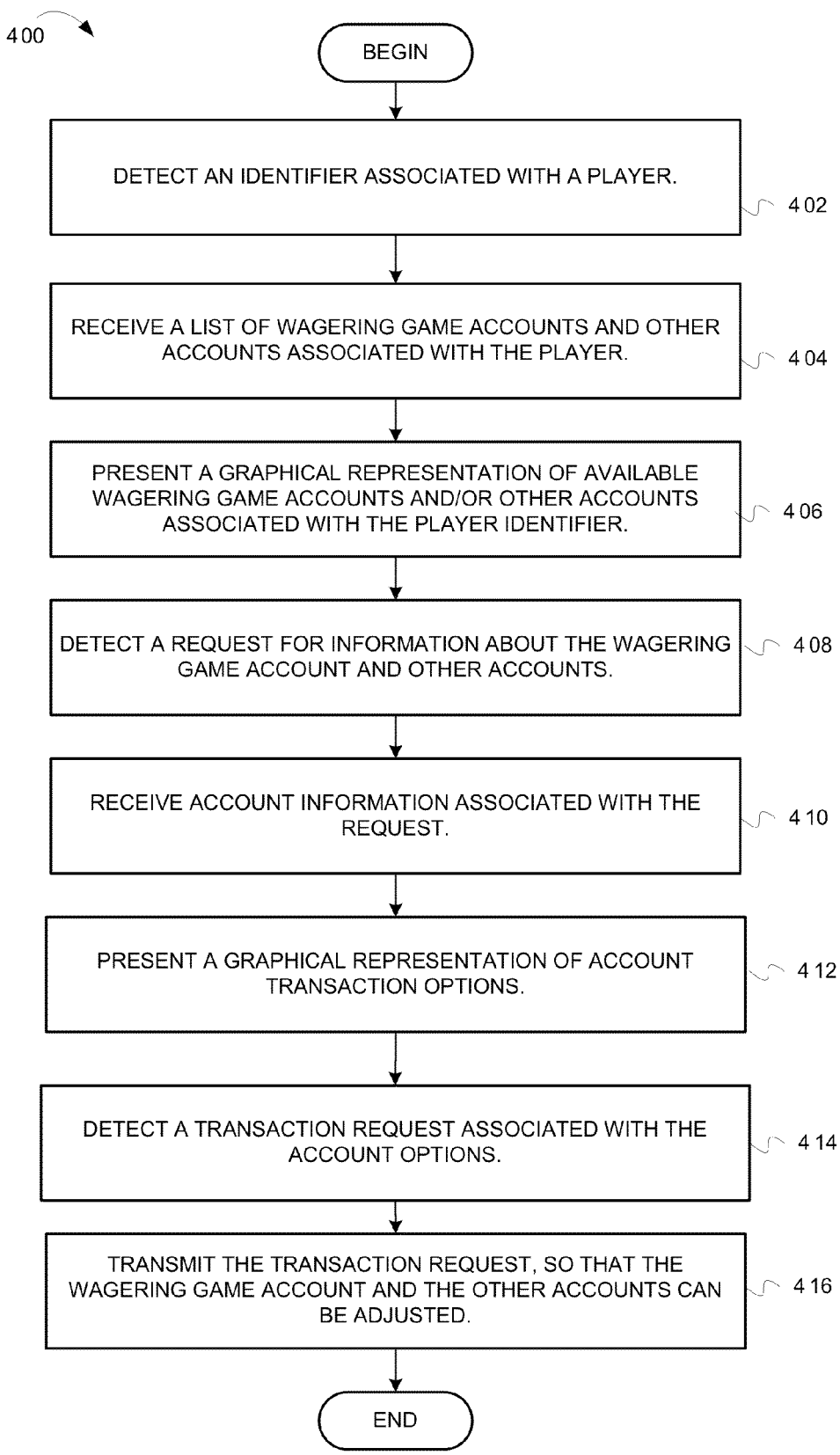
FIG. 4 is a flow diagram illustrating operations for facilitating account transactions on a wagering game machine through a user interface, according to example embodiments of the invention.
Figure 5A:
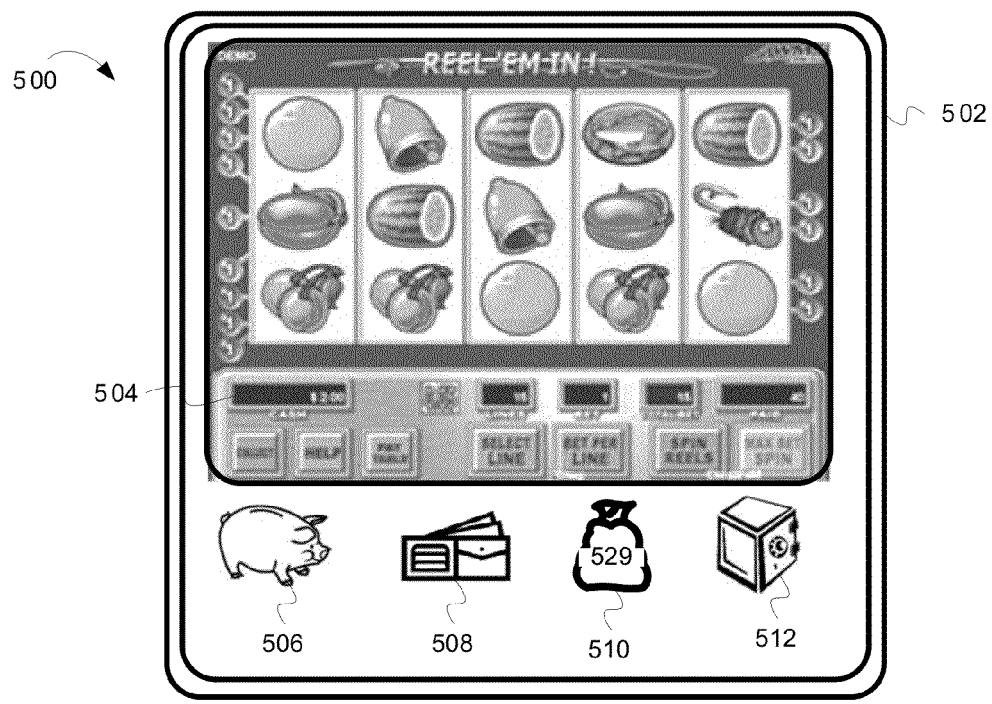
FIG. 5A is a block diagram illustrating a graphical user interface through which players can request account transactions from a wagering game machine, according to example embodiments of the invention.
Figure 5B:
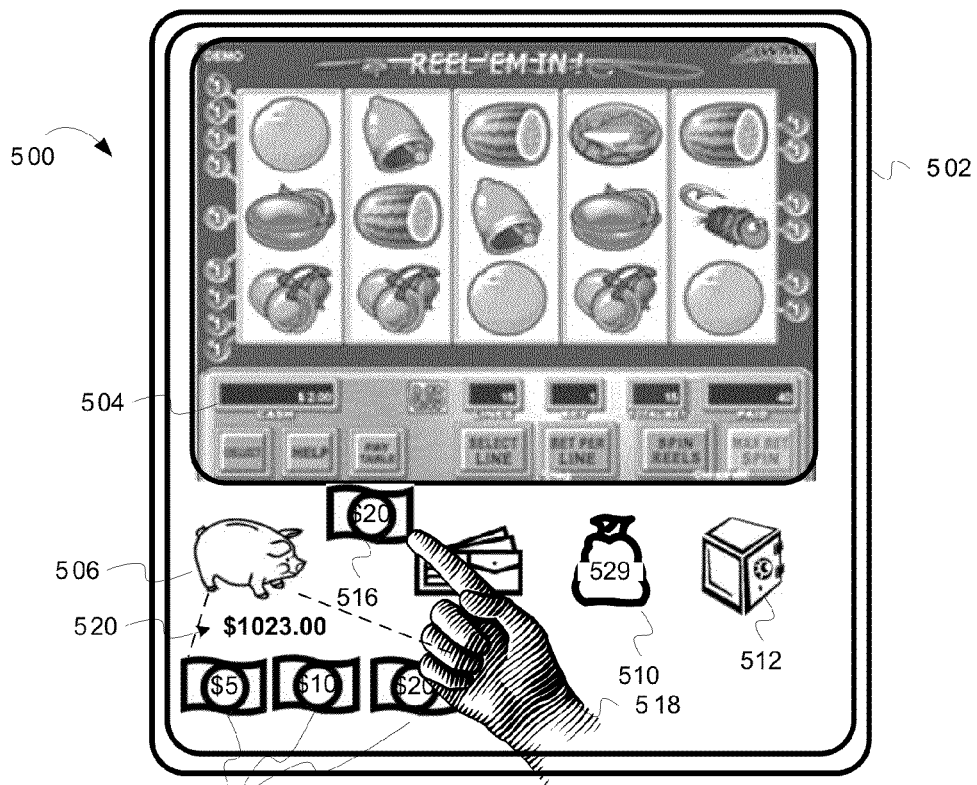
FIG. 5B is a block diagram illustrating account information in a wagering game machine's graphical user interface, according to example embodiments of the invention.
Figure 6:
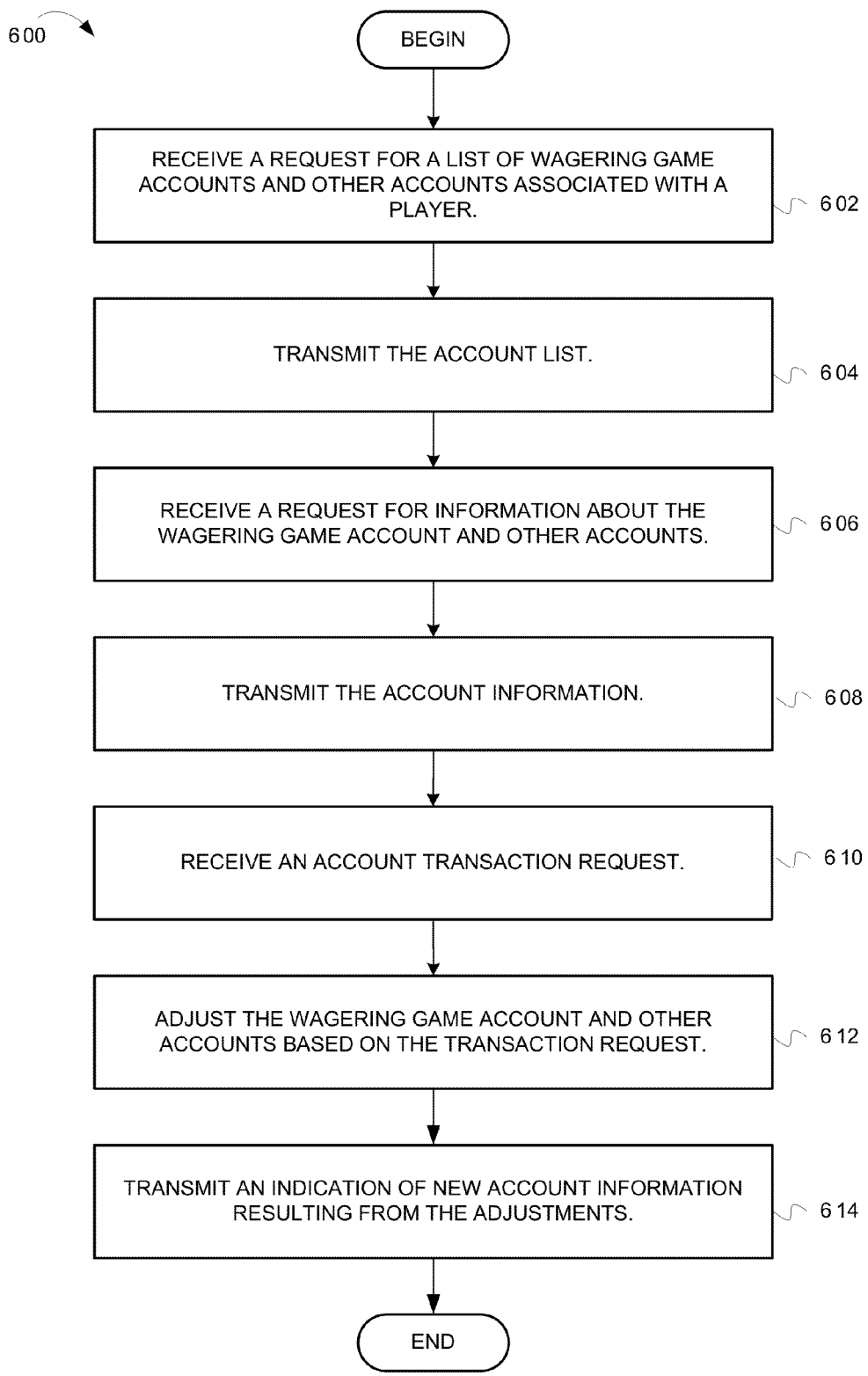
FIG. 6 is a flow diagram illustrating operations for processing account transactions made at a wagering game machine, according to example embodiments of the invention.

The section will discuss FIGS. 4-11. FIGS. 4-6 will describe operations and interfaces for performing account transactions in response to player input. The discussion of FIGS. 7-11 will describe operations and interfaces for configuring account rules and performing account transactions based on the account rules.

Account Transactions

FIG. 4 is a flow diagram illustrating operations for facilitating account transactions on a wagering game machine through a user interface, according to example embodiments of the invention. The flow diagram 400 will be described with reference to the FIG. 3's wagering game network and FIG. 2's wagering game architecture. The flow begins at block 402.

At block 402, a wagering game machine 302 detects a player identifier. The wagering game machine 302 may detect the player identifier as a result of a player swiping a player account card, manually entering the identifier, or providing some other device that indicates the player identifier (e.g., an RFID tag). The flow continues at block 404.

At block 404, the wagering game machine 302 receives a list of wagering game accounts and other accounts associated with the player identifier. In some embodiments, the wagering game machine's account manager 236 requests and receives the list from the account controller 318. The flow continues at block 406.

At block 406, the wagering game machine 302 presents a graphical representation of the wagering game accounts and/or other accounts enumerated in the list. For example, the wagering game machine's account manager 236 presents, on the primary display 210, a user interface including graphics that represent financial accounts associated with the player identifier. FIG. 5A shows one such user interface.

FIG. 5A is a block diagram illustrating a graphical user interface through which players can request account transactions from a wagering game machine, according to example embodiments of the invention. In FIG. 5A, the graphical user interface 500 appears on a wagering game machine's touchscreen 502. As shown, the user interface 500 includes graphics representing accounts associated with a player identifier. The graphics include a game session account icon 504, savings account icon 506, casino account icon 508, §529 account icon 510, and money market account icon 512. The GUI 500 can show icons for any number of financial accounts. The accounts can include a game session account, casino debit/credit accounts, checking accounts, savings accounts, educational savings accounts (e.g., a §529 account), charity accounts (e.g., accounts that aid responsible gaming programs), holiday savings accounts, etc. According to embodiments, players can request account transactions by interacting with the icons.

Referring back to FIG. 4, the flow continues at block 408.

At block 408, the wagering game machine 302 detects a request for information about the wagering game account and/or other accounts. For example, the account manager 236 detects that a player has activated an icon in the user interface. The flow continues at block 410.

At block 410, the wagering game machine 302 receives account information associated with the account access request. The account information can include an account balance, transaction options associated with the account, and other information related to the account. In some embodiments, the account manager 236 requests and receives the account information from the account controller 318. Flow continues at block 412.

At block 412, the wagering game machine presents a graphical representation of the account information. To illustrate this concept, FIG. 5B shows how some embodiments can present account information including transaction options in a GUI.

FIG. 5B is a block diagram illustrating account information in a wagering game machine's graphical user interface, according to example embodiments of the invention. Players can activate the account icons by pressing the touchscreen 502. After an account icon is activated, the interface 500 presents additional account transaction options, which are represented by additional icons. In FIG. 5B, the player 518 has activated the savings account icon 506. As a result, the interface 500 has presented a savings account balance 520 and currency icons 514, which allow the player 518 to transfer different denominations between a savings account and other accounts. As shown, the player 518 is dragging a $20 currency icon 516 into the game session account icon 504. This drag-and-drop operation constitutes a request to transfer $20 from the player's savings account into the player's game session account. The GUI 500 supports similar drag-and-drop operations to request other transfers.

Referring back to FIG. 4, the flow continues at block 414.

At block 414, the wagering game machine 302 detects a transaction associated with the account options. For example, the account manager 236 detects a drag-and-drop operation that signifies an account transaction request. The drag-and-drop operations can indicate all parameters needed to request an account transaction. For example, drag-and-drop operations can indicate a transaction type, source account, destination account, currency amount, etc. The flow continues at block 416.

At block 416, the wagering game machine 302 transmits an indication of the transaction request, so the wagering game account and/or other accounts can be adjusted. For example, the account unit 236 transmits, to the account controller 318, an indication of the transactions that the player requested via the user interface. From block 416, the flow ends.

Thus far, this section has described account operations typically performed by wagering game machines. This section will continue with a discussion about account operations that are typically performed by account controllers.

FIG. 6 is a flow diagram illustrating operations for processing account transactions made at a wagering game machine, according to example embodiments of the invention. The flow 600 describes operations by which an account controller transmits information to wagering game machines. In some embodiments, the wagering game machines include logic for presenting the information (e.g., see discussion of FIG. 4). In other embodiments (e.g., where the wagering game machine includes a thin client) the account controller can control presentation of the information on the wagering game machines. The flow 600 begins at block 602.

At block 602, the account controller 318 receives (from a wagering game machine 302) a request for a list of wagering game accounts and other financial accounts associated with a player. The flow continues at block 604.

At block 604, the account controller 318 transmits the account list to the wagering game machine 302. As noted above, in some embodiments, the account controller 318 may control presentation of the account list on the wagering game machine 302. The flow continues at block 606.

At block 606, the account controller 318 receives a request for information about the wagering game account and other accounts. For example, the request may ask for account balances, transaction options, information about recent transactions, etc. The flow continues at block 608.

At block 608, the account controller 318 transmits the account information to the wagering game machine 302. The flow continues at block 610.

At block 610, the account controller 318 receives an account transaction request from the wagering game machine 302. For example, the account controller 318 receives a request to transfer funds from the player's savings account to the player's game session account. The flow continues at block 612.

At block 612, the account controller 318 adjusts the accounts based on the transaction request. For example, the account controller 318 instructs the financial institution computer 324 to deliver funds from a savings account to a game session account. In some embodiments, the account controller 318 does not transfer funds directly into game session accounts. Instead, the account controller 318 deposits funds into other wagering game accounts. Later, the account controller 318 can transfer funds from the wagering game accounts to game session accounts, if needed. The flow continues at block 614.

At block 614, the account controller 318 provides account information indicating the results of the requested transactions. For example, the account controller 318 notifies the player that funds have been transferred between the player's savings account and game session account. The account controller 318 can notify the player by sending a message to the wagering game machine 302. In some embodiments, the wagering game machine 302 will update its credit meter or other related balances accordingly. From block 614, the flow ends.

Account Rules

This section continues with a discussion of account rules. Some embodiments enable players to submit rules that automatically initiate account transactions when certain conditions are met. In some embodiments, the account rules specify account transactions, source and destination accounts, amounts, and trigger conditions. The account transactions can include transfers, deposits, withdrawals credits, debits, etc. When appropriate, source and destination accounts are identified (e.g., for transfers). Trigger conditions indicate when rules should be enforced. Trigger conditions can relate to time, account balances, wagering game results, wagers placed, and any other statistic associated with wagering game accounts, other financial accounts, and wagering games.

In some embodiments, players can use account rules to limit losses. For example, a player can create account rules that limit how much money can be transferred from a checking account into a game session account. Alternatively, players can move a portion of each winning jackpot from a game session account into savings account, where the savings account does not support wagering-game-related withdrawals. Players can also create account rules that transfer percentages of winnings to fund savings plans, charities, and other programs (e.g., responsible gambling programs). Furthermore, in some embodiments, players can create account rules that, at the conclusion of a gaming session, automatically transfer the entire game session account balance to another account, such as a casino debit account, checking account, or the like. As a result, embodiments eliminate the need for wagering game machines to return cash or cashless vouchers at the end of gaming sessions.

The following discussion will describe account rules in more details. In particular, the discussion of FIG. 7 will describe operations for presenting an account rule interface, while the discussion of FIGS. 8 & 9 will describe account rule interfaces. The discussion of FIGS. 10 & 11 will cover operations for creating and enforcing account rules.

Figure 7:
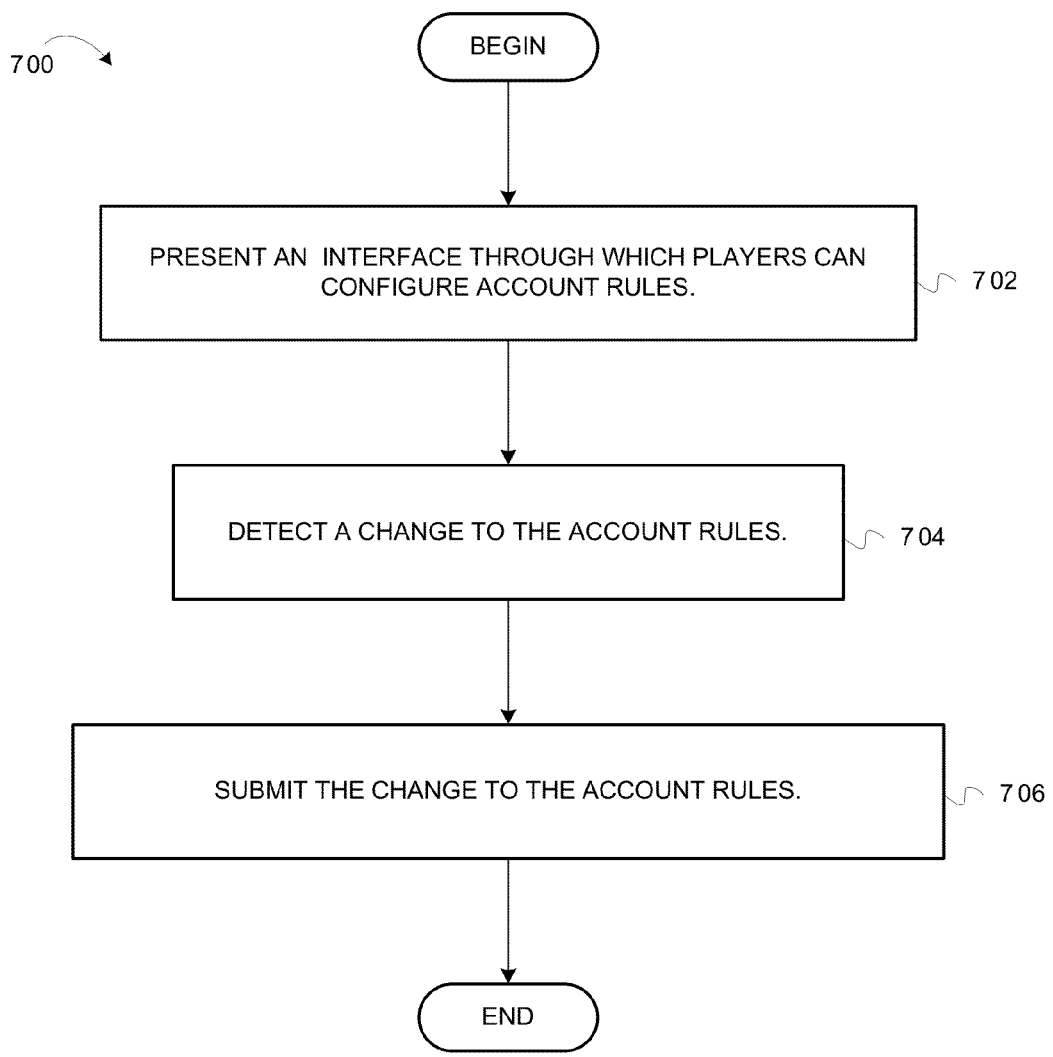
FIG. 7 is a flow diagram illustrating operations for presenting an account rule interface, according to example embodiments of the invention.

FIG. 7 is a flow diagram illustrating operations for presenting an account rule interface, according to example embodiments of the invention. The flow 700 begins at block 702.

At block 702, a wagering game machine 302 presents an interface through which players can view and configure account rules. In some embodiments, the account manager 236 and/or other components create the account rule interface and populate it with account information received from the account controller 318. In other embodiments, the machine 302 renders the account interface in a web browser, using information received from the account controller 318 or other network devices. FIG. 8 shows one embodiment of an account rules interface.

FIG. 8 is a block diagram illustrating an account rules interface, according to example embodiments of the invention. In FIG. 8, the account rules interface 802 shows account rules currently affecting a player's financial accounts. The account rules interface 802 is divided into rows, where the rows show parameters for each account rule. The parameters for each account rule (shown in row 806) include "ACTION", "AMOUNT", "SOURCE ACCOUNT", "DESTINATION ACCOUNT", and "TRIGGER". For example, the row 808 shows an account rule that transfers $200 from the player's checking account to the player's casino account every day at 12:00 am. Another rule, shown in row 812, transfers $100 from the player's casino account to the player's money market account when the casino account is greater than $200. In addition to showing the account rules, the account rules interface 802 includes a button 804 that can bring-up an interface for adding new rules. Although FIG. 8 shows an account rules interface in which players select from a predetermined parameter values, other embodiments enable players to create account rules by entering text (i.e., without a predetermined parameters) or by any other suitable method.

Referring back to FIG. 7, the flow continues at block 704.

Figure 9:
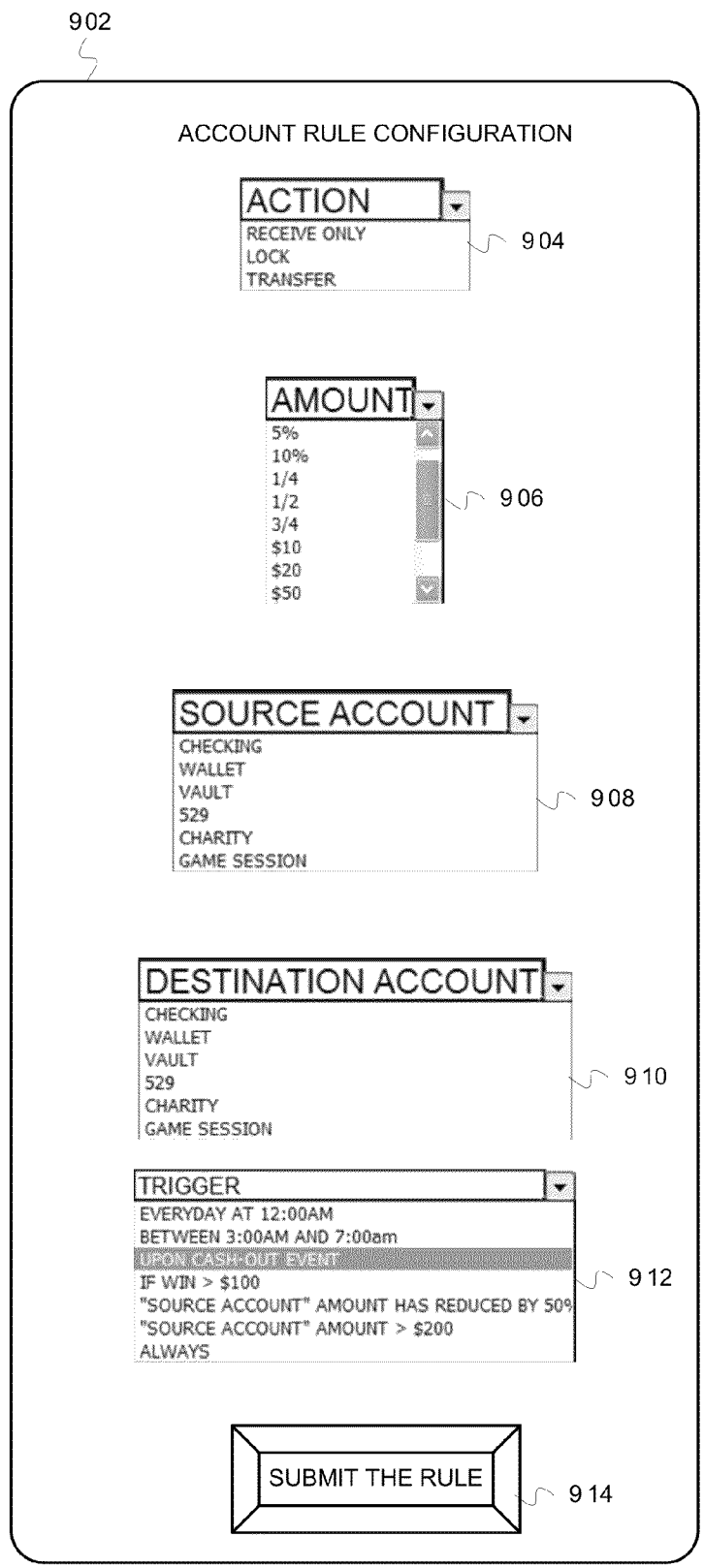
FIG. 9 is a block diagram illustrating an interface for configuring account rules, according to example embodiments of the invention.

At block 704, the wagering game machine 302 detects a change to the account rules. For example, the wagering game machine 302 detects that a player has attempted to create new rules or modify existing rules. In some embodiments, players can create and modify rules as follows. In the embodiment of FIG. 8, players can modify existing rules by activating a particular row in the interface 802 or by activating the button 804. After the player activates a row or the button 804, the wagering game machine 302 brings-up an interface for creating and modifying account rules. FIG. 9 shows one such interface.

FIG. 9 is a block diagram illustrating an interface for creating and modifying account rules, according to example embodiments of the invention. In FIG. 9, the account rules interface 902 includes drop-down menus for configuring account rule parameters. In particular, the interface 902 includes an ACTION menu 904, AMOUNT menu 906, SOURCE ACCOUNT menu 908, DESTINATION ACCOUNT menu 910, and a TRIGGER menu 912. Players can configure account rule parameters by selecting values from the menus 904-912. In some embodiments, when an existing rule is being modified, the menus 904-912 show the current parameter values.

Referring back to FIG. 7, the flow continues at block 706.

At block 706, the wagering game machine 302 submits the change to the account rules. Referring to FIG. 9, after a player has selected account rule parameters in the menus 904-912, the player can press the button 914 to submit the account rule for inclusion in the player's rule set. In some embodiments, the wagering game machine 302 submits the change by transmitting an indication of the change to the account controller 318. From block 706, the flow ends.

Although wagering game machines can perform the operations of the flow 700, in some embodiments, other devices perform those operations. For example, in a casino, players can use the kiosk 326 to view, create, and modify their account rules. From outside the casino, players can view, create, and modify account rules using the workstation 328, which in some embodiments can communicate with the account controller 318 over the world wide wed and/or the Internet. Account controllers can also play a role in the process with which players view, create, and modify account rules. This section continues with a discussion about how account servers can interact with a wagering game machine, kiosks, and workstations to process and store account rules.

Figure 10:
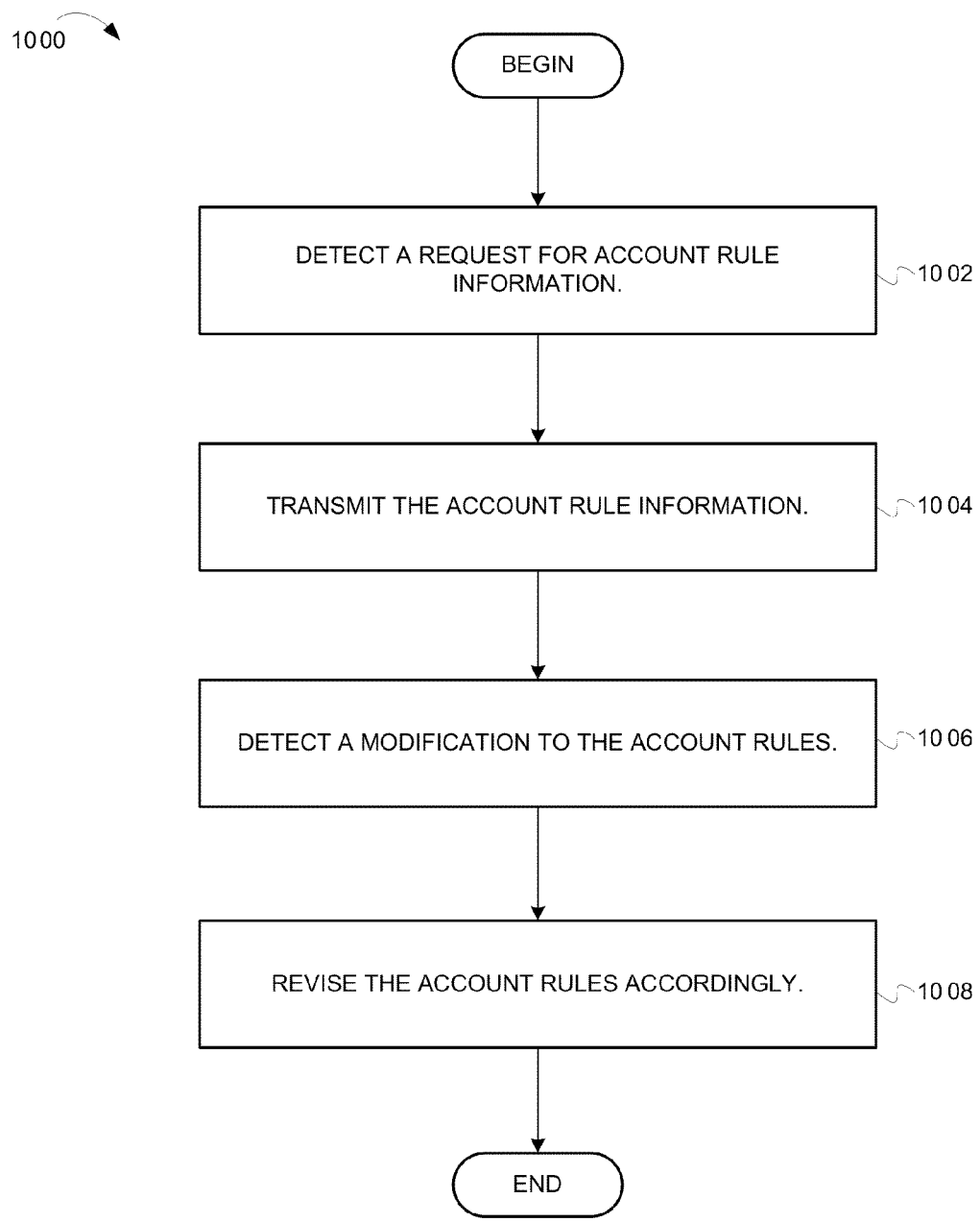
FIG. 10 is a flow diagram illustrating operations for processing and storing account rules, according to example embodiments of the invention.

FIG. 10 is a flow diagram illustrating operations for processing and storing account rules, according to example embodiments of the invention. The flow diagram 1000 begins at block 1002.

At block 1002, the account controller 318 detects a request for account rule information. In one embodiment, the account controller 318 receives the request from a wagering game machine 302 that is presenting the account rules interface 802. The account rule information can include account rules associated with a player. The flow continues at block 1004.

At block 1004, the account controller 318 transmits the account rule information to the requester (e.g., a wagering game machine 302). The account rule information can be in a form suitable for populating an account rules interface (e.g., see FIG. 8). The flow continues at block 1006.

At block 1006, the account controller 318 detects a modification to the account rules associated with a player identifier. In some embodiments, the account controller 318 receives, from a wagering game machine 302, a request to modify account rules associated with a player. The request can enumerate account rule parameters for a new account rule or for an existing rule. The flow continues at block 1008.

At block 1008, the account controller 318 revises the account rules accordingly. For example, the account controller 318 modifies a player's account rules using the rule parameters received at block 1006. In some embodiments, the account controller 318 notifies the player that the account rules have been modified successfully or that there was an error updating the account rules. From block 1008, the flow ends.

This section continues with a discussion about operations for enforcing the account rules.

Figure 11:
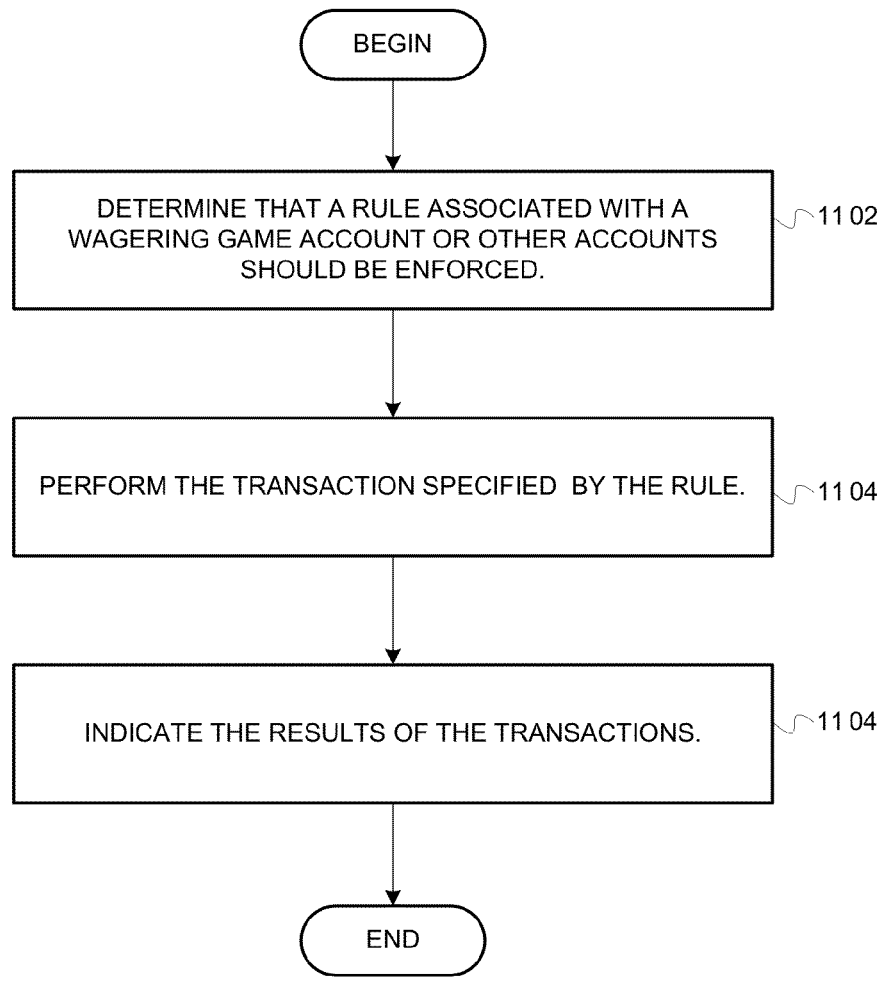
FIG. 11 is a flow diagram illustrating operations for enforcing account rules in a wagering game system, according to example embodiments of the invention.

FIG. 11 is a flow diagram illustrating operations for enforcing account rules in a wagering game system, according to example embodiments of the invention. The flow 1100 begins at block 1102.

At block 1102, the account controller 318 determines that a rule associated with a wagering game account should be enforced. As noted above, account rules can be associated with trigger condition. For example, winning jackpots, placing wagers, playing certain games, account balances, time of day, total amount of wagers made, etc. can trigger account rules to perform financial transactions. In some embodiments, the wagering game machines 302 notifies the account controller 318 about any information relevant to a player's account rules. For example, wagering game machines 302 can notify the account controller 318 when a player wins a jackpot, makes a wager, plays a game, begins a game session, ends a game session, etc. In response, the account controller 318 can determine whether any account rules' trigger conditions have been satisfied. In other embodiments, the wagering game machines 302 can acquire a list of account rules and notify the account controller 318 only when a trigger condition has been satisfied.

In some embodiments, account rules are not associated with wagering game events. For example, account rules can be related to time, account balances, account transactions, etc. Thus, the account controller 318 can use time, account balances, account transactions, and other non-event-related information to determine that an account rules should be enforced. The flow continues at block 1104.

At block 1104, the account controller 318 performs transactions specified in the account rules that are being enforced. For example, if an account rule specifies a transfer of funds, the account controller 318 transfers funds between accounts. As another example, if the account rule specifies that an account is to be locked, the account controller 318 locks the account. As yet another example, if the account rule specifies that certain transactions are prohibited (e.g., withdrawals from a retirement account), the account controller 318 marks the account as deposit only. The account controller 318 may enforce some account rules with assistance from the financial institution computer 324. The flow continues at block 1106.

At block 1106, the account controller 318 provides an indication of the financial transactions. In some embodiments, the account controller 318 can transmit a transaction statement for display on the wagering game machine 302 at which the player is present (e.g., in an account interface). Alternatively, the account controller 318 can notify the player via email, instant message, telephone message, etc. From block 1106, the flow ends.

Example Wagering Game Machines

Figure 12:
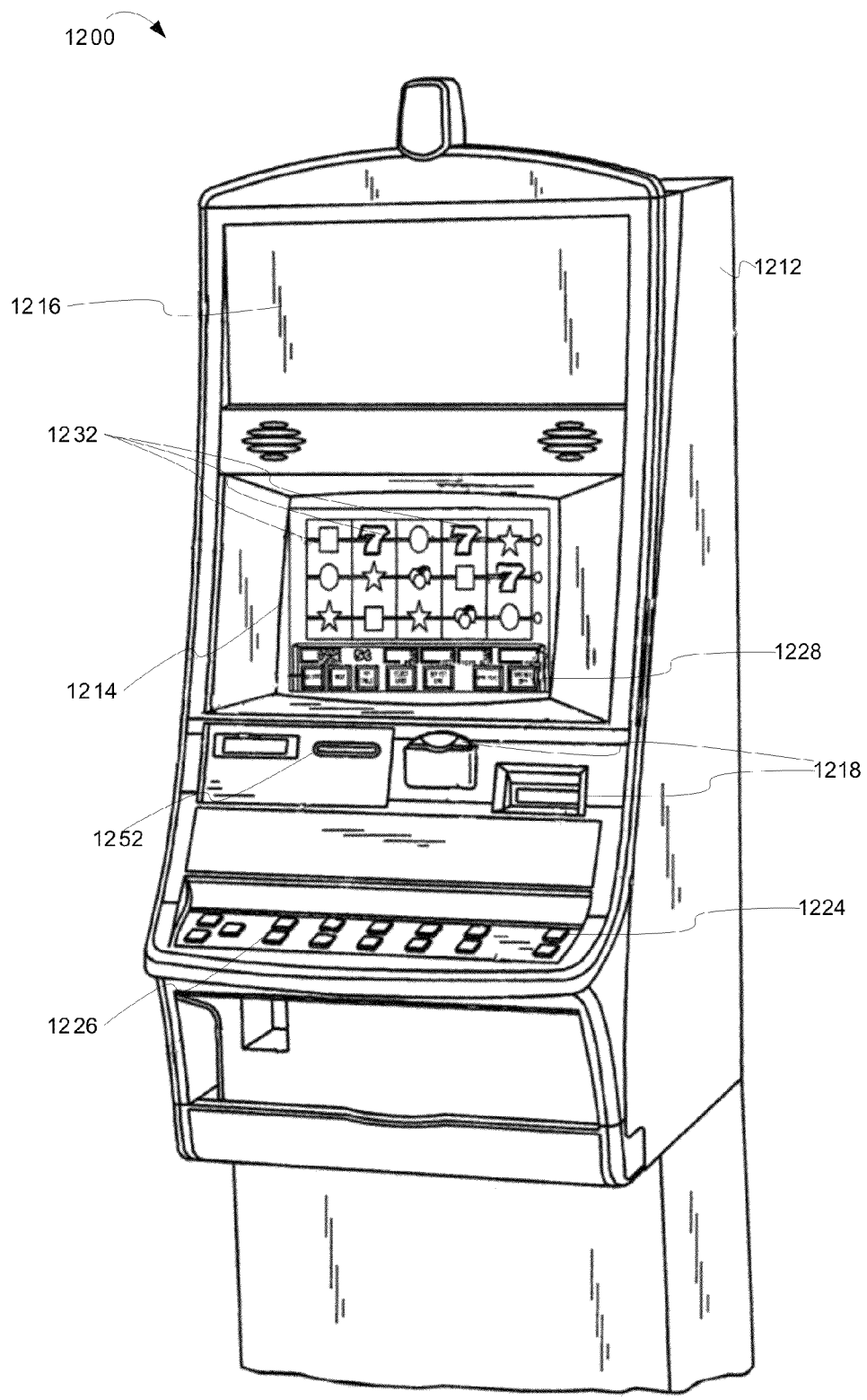
FIG. 12 is a perspective view of a wagering game machine, according to example embodiments of the invention.

FIG. 12 is a perspective view of a wagering game machine, according to example embodiments of the invention. Referring to FIG. 12, a wagering game machine 1200 is used in gaming establishments, such as casinos. According to embodiments, the wagering game machine 1200 can be any type of wagering game machine and can have varying structures and methods of operation. For example, the wagering game machine 1200 can be an electromechanical wagering game machine configured to play mechanical slots, or it can be an electronic wagering game machine configured to play video casino games, such as blackjack, slots, keno, poker, blackjack, roulette, etc.

The wagering game machine 1200 comprises a housing 1212 and includes input devices, including value input devices 1218 and a player input device 1224. For output, the wagering game machine 1200 includes a primary display 1214 for displaying information about a basic wagering game. The primary display 1214 can also display information about a bonus wagering game and a progressive wagering game. The wagering game machine 1200 also includes a secondary display 1216 for displaying wagering game events, wagering game outcomes, and/or signage information. While some components of the wagering game machine 1200 are described herein, numerous other elements can exist and can be used in any number or combination to create varying forms of the wagering game machine 1200.

The value input devices 1218 can take any suitable form and can be located on the front of the housing 1212. The value input devices 1218 can receive currency and/or credits inserted by a player. The value input devices 1218 can include coin acceptors for receiving coin currency and bill acceptors for receiving paper currency. Furthermore, the value input devices 1218 can include ticket readers or barcode scanners for reading information stored on vouchers, cards, or other tangible portable storage devices. The vouchers or cards can authorize access to central accounts, which can transfer money to the wagering game machine 1200.

The player input device 1224 comprises a plurality of push buttons on a button panel 1226 for operating the wagering game machine 1200. In addition, or alternatively, the player input device 1224 can comprise a touch screen 1228 mounted over the primary display 1214 and/or secondary display 1216.

The various components of the wagering game machine 1200 can be connected directly to, or contained within, the housing 1212. Alternatively, some of the wagering game machine's components can be located outside of the housing 1212, while being communicatively coupled with the wagering game machine 1200 using any suitable wired or wireless communication technology.

The operation of the basic wagering game can be displayed to the player on the primary display 1214. The primary display 1214 can also display a bonus game associated with the basic wagering game. The primary display 1214 can include a cathode ray tube (CRT), a high resolution liquid crystal display (LCD), a plasma display, light emitting diodes (LEDs), or any other type of display suitable for use in the wagering game machine 1200. Alternatively, the primary display 1214 can include a number of mechanical reels to display the outcome. In FIG. 12, the wagering game machine 1200 is an "upright" version in which the primary display 1214 is oriented vertically relative to the player. Alternatively, the wagering game machine can be a "slant-top" version in which the primary display 1214 is slanted at about a thirty-degree angle toward the player of the wagering game machine 1200. In yet another embodiment, the wagering game machine 1200 can exhibit any suitable form factor, such as a free standing model, bartop model, mobile handheld model, or workstation console model.

A player begins playing a basic wagering game by making a wager via the value input device 1218. The player can initiate play by using the player input device's buttons or touch screen 1228. The basic game can include arranging a plurality of symbols along a payline 1232, which indicates one or more outcomes of the basic game. Such outcomes can be randomly selected in response to player input. At least one of the outcomes, which can include any variation or combination of symbols, can trigger a bonus game.

In some embodiments, the wagering game machine 1200 can also include an information reader 1252, which can include a card reader, ticket reader, bar code scanner, RFID transceiver, or computer readable storage medium interface. In some embodiments, the information reader 1252 can be used to award complimentary services, restore game assets, track player habits, etc.

Additional Embodiments

Figure 13:
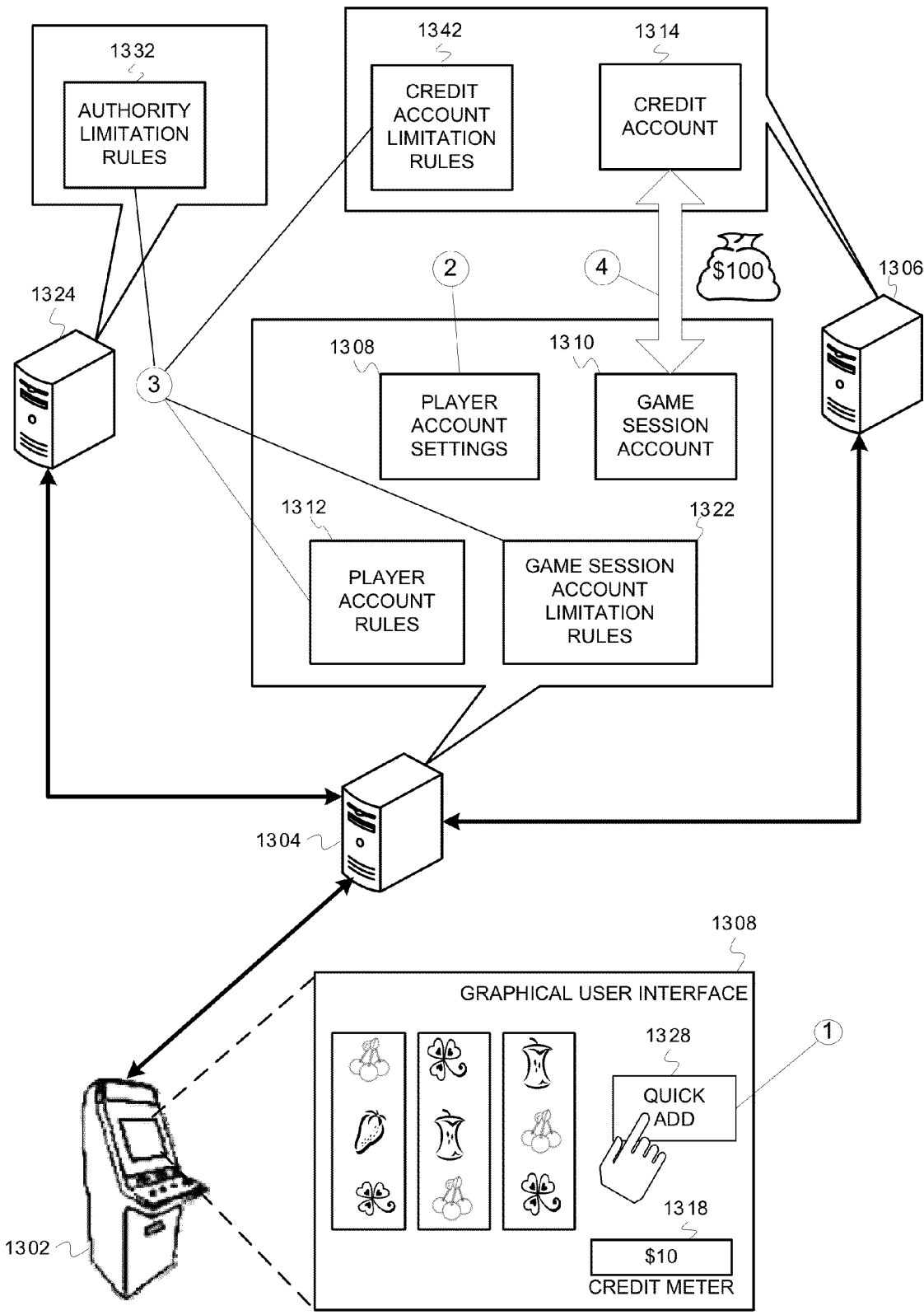
FIG. 13 is an illustration of managing account transactions and determining use limitations, according to some embodiments.

FIG. 13 is an illustration of managing account transactions and determining use limitations, according to some embodiments. In FIG. 13, a wagering game machine 1302 is connected to an account controller 1304, which is connected to a financial institution computer 1306 and a jurisdictional authority computer 1324. The wagering game machine 1302 provides a graphical user interface (GUI) 1308 through which players request account transactions, create account rules, etc. The graphical user interface 1308 includes a control button 1328 that is preconfigured to access player account settings 1308. The player account settings 1308 can include information about a financial account, such as a credit account 1314, a checking account, a savings account, etc., that the account controller 1314 can use to quickly, and electronically, augment a balance on a wagering game session account 1310. Herein, the procedure for quickly augmenting funds from a financial account (e.g., a credit account), to a wagering game account (e.g., a wagering game session account), can be referred to as a "quick wagering game account augmentation" ("Quick Add") procedure or "Quick Add" transaction. A mechanism (e.g., a button, a trigger, etc.) for initiating a Quick Add procedure, such as the control button 1328, can also be referred to herein as a "Quick Add" mechanism (e.g., the control button 1328 may be referred to as a Quick Add button 1328). The account controller 1304 can detect when the Quick Add button 1328 is activated by a player (not shown), obtain information from the player account settings 1308, check for limitations on the use of the credit account, and make decisions based on the limitations. The limitations are restrictions and limits on the use of the credit account 1314 that can help the player to responsibly utilize the credit account 1314 for wagering game purposes. For example, the account controller 1304 can look to limitation rules from various rules sources (e.g., from authority limitation rules 1332, from wagering game session account limitation rules 1322, from credit account limitation rules 1342, and from self-imposed limitations stored in the player account rules 1312). Based on the limitations stored within the rules sources, the account controller 1304 can determine, for instance, (a) if the player is authorized to access the credit account 1314, (b) if the player is restricted from making credit transactions on wagering games, (c) how much money the game session account 1310 is authorized to transact in a specified period, (d) how much money the credit account 1314 is authorized to transact, etc.

Figure 14:
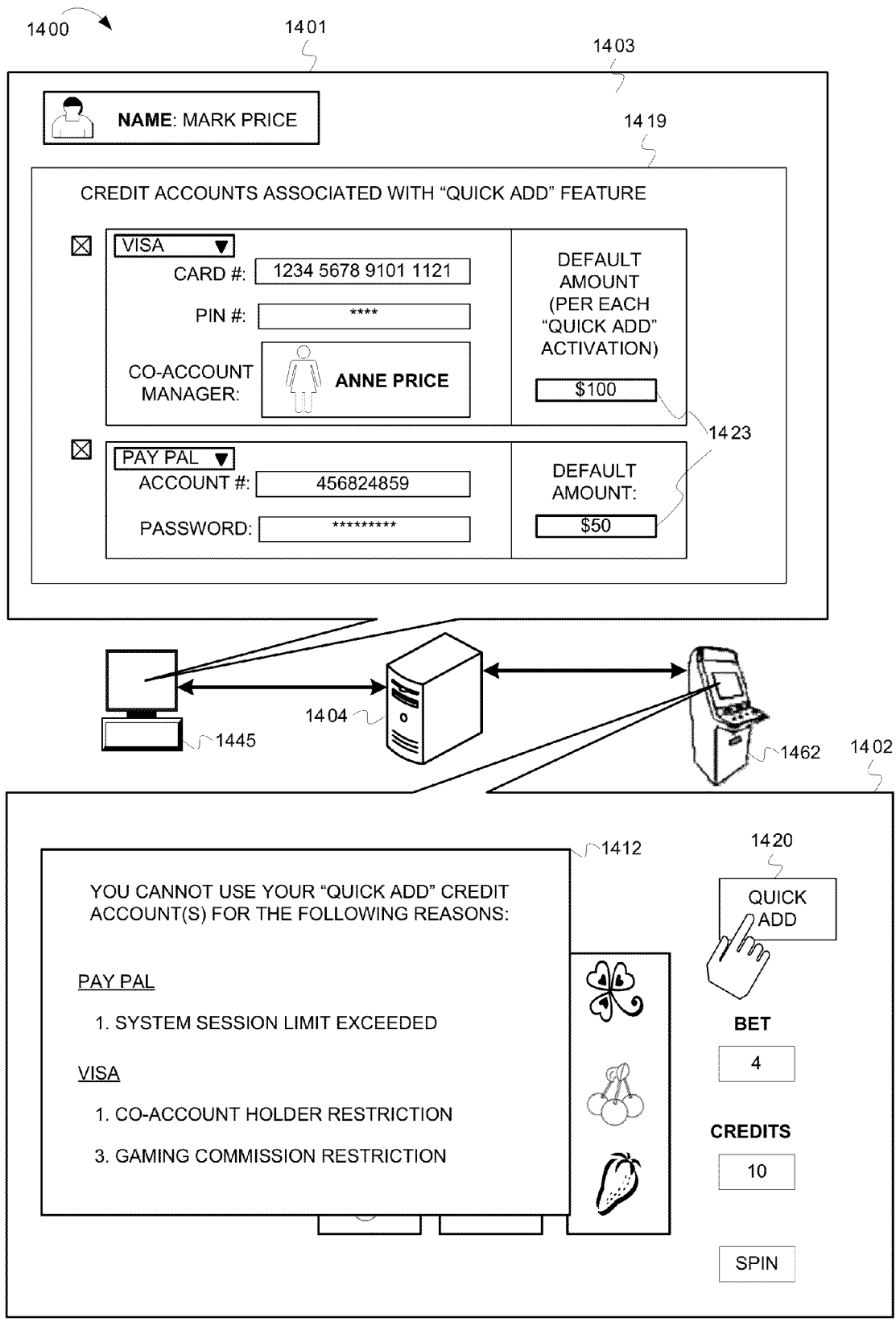
FIG. 14 is an illustration of managing use limitations in connection with credit accounts, according to some embodiments.
Figure 15:
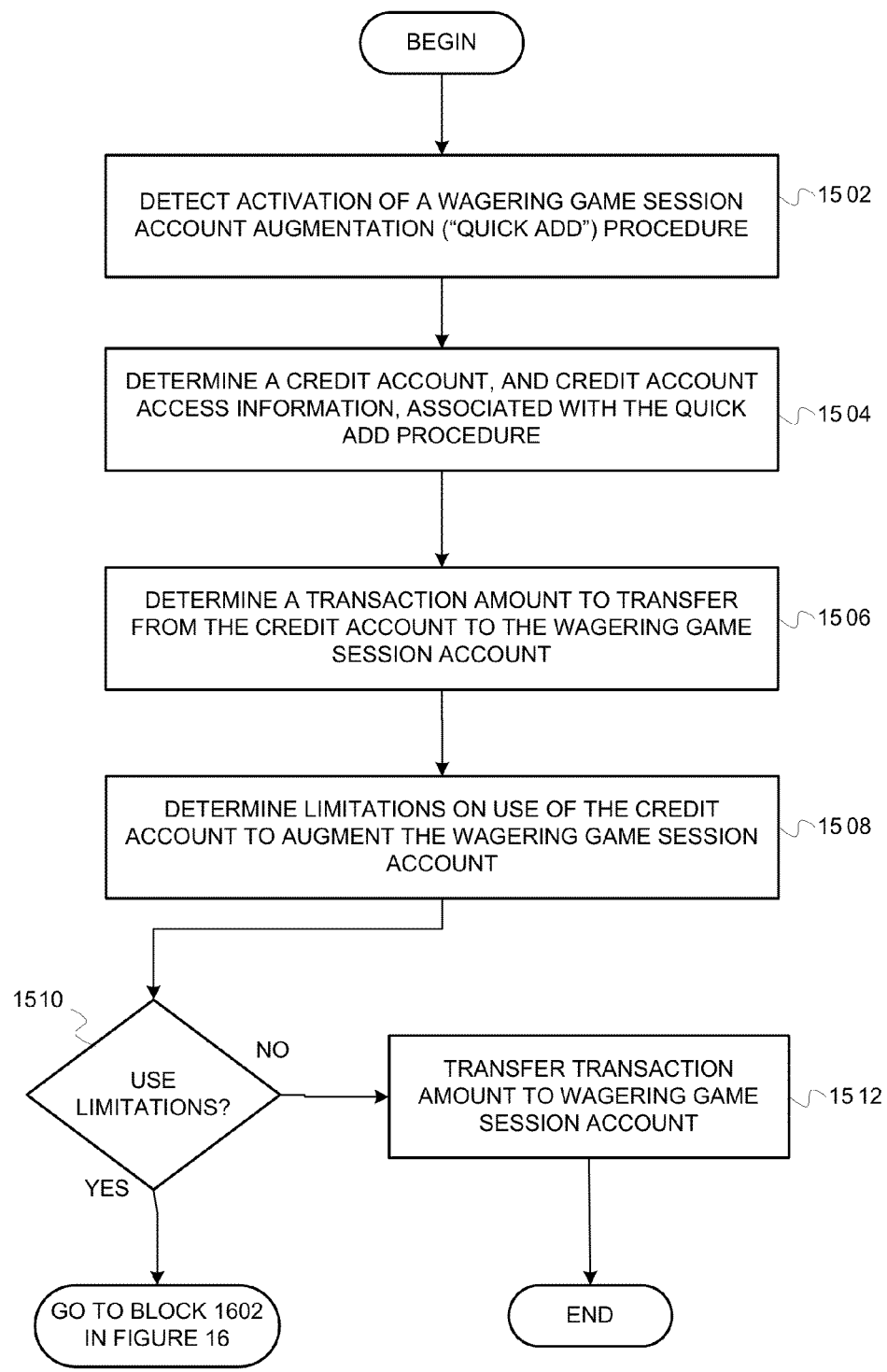
FIG. 15 is a flow diagram 1500 illustrating determining limitations on credit accounts for augmenting a wagering game session account, according to some embodiments.
Figure 16:
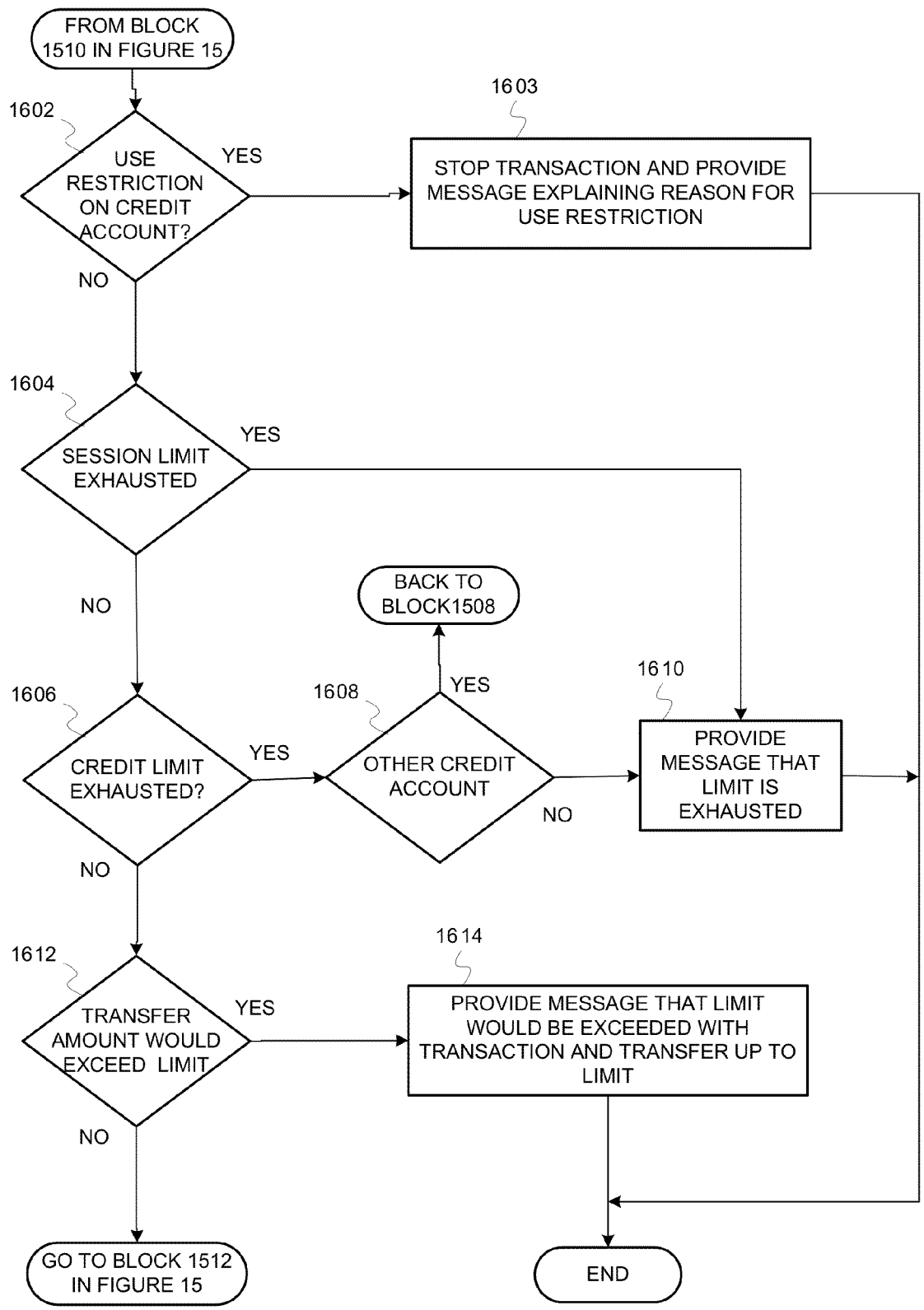
FIG. 16 is a flow diagram 1600 illustrating controlling use limitations, according to some embodiments.

FIG. 13 shows four transactions. In the first transaction (see "1" in FIG. 13) a player (not shown) uses the interface 1308 to select the Quick Add button 1328 to request a quick funds augmentation of the wagering game session account 1310. After the wagering game machine 1302 receives the player's request, the machine 1302 notifies the account controller 1304 about the request. As a result, in the second transaction (see "2"), the account controller 1304 accesses the player account settings 1308 to determine a transaction amount (e.g., $100) associated with the Quick Add button 1328. The account controller 1304 also determines credit account information, from the player account settings 1308, to be able to access the credit account 1314 and transfer the transaction amount. However, before initiating the transfer of the transaction amount, the account controller 1304 first accesses (see "3") the player account rules 1312, the wagering game session account limitation rules 1322, the credit account limitation rules 1342, and the authority limitation rules 1332. The account controller 1304 determines whether there are any rules that restrict the money transaction between the credit account 1314 and the wagering game session account 1310. If there are no restrictions or use limits, the account controller 1304 can transfer (see "4") the transaction amount (e.g., $100) from the credit account 1314 to the player's wagering game session account 1310. Funds in the wagering game session account 1310 appear on the wagering game machine's credit meter 1318 and are available for use in wagering games presented on the wagering game machine 1302. If, however, there are limitations, the account controller 1304 can enforce the limitations. FIGS. 14, 15, and 16 illustrate some example embodiments and operations of how a player account can be configured to utilize and enforce limitations in connection with credit accounts.

FIG. 14 is an illustration of managing use limitations in connection with credit accounts, according to some embodiments. In FIG. 14, a wagering game system ("system") 1400 includes a client computer 1445 connected to an account server 1404. The account server 1404 can include an account controller, or be connected to another device with an account controller, according to some embodiments. The account server 1404 can also include an account manager, for example, account manager 236 in FIG. 2. The account server 1404 can include a player account 1403. In some embodiments, the client computer 1445 can be a home computer which a player can use to access the player account 1403 via the Internet. In some embodiments, the client computer 1445 can be a terminal at a kiosk or a casino cage. In some embodiments, the client computer 1445 can be a wagering game machine. The player account 1403 can include an account settings panel 1419 that a player can use to store account information about one or more credit accounts (e.g., credit card accounts, Internet credit accounts, bank lines of credit, casino lines of credit, etc.) The account information can include account holder information (e.g., name, address, etc.), credit card numbers, personal identification numbers (PINs), account access numbers, passwords, etc. The system 1400 can use the account information to access the one or more credit accounts. FIG. 13 describes some embodiments for accessing a credit account. The account information can also include a default transaction amount 1423 per each credit account that the system 1400 can transact during a Quick Add procedure. The system 1400 can cycle through the credit accounts to use during the Quick Add procedure. In some embodiments, the system 1400 can pre-load a specific amount into a holding account that can be used during the wagering game session. In other words, instead of transacting with a credit account when a Quick Add procedure is processed during a wagering game session, the system 1400 can have a holding account that the player "fills up" from the credit account before beginning a wagering game session. The system 1400 can then access the holding account instead of having to make a transaction with the credit account multiple times during the wagering game session. The system 1400, however, can limit the amount that can be stored in the holding account to prevent the player from preloading a large amount of funds from the credit account. The system 1400, therefore, can have limitations, as described in FIGS. 13, 15, and 16, which can help keep the player's use of the credit account in check.

The system 1400 also includes a wagering game machine 1462. The wagering game machine 1462 has a graphical user interface ("GUI") 1402 that a player can use to play wagering games. The GUI 1402 can also include a Quick Add button 1420, which can initiate a Quick Add procedure to automatically add money to a wagering game session balance. The Quick Add button 1420 can initiates a series of operations that the system 1400 can perform, similar to the operations described in FIG. 13, 15, and/or 16. For example, the system 1400 can access a wagering game session account on the account server 1404 and search limitation rules sources for limitations rules that have been set on the use of the credit accounts in the account settings panel 1419. FIG. 13 described various sources for the limitation rules. One of the sources can be a player's account rules. For instance, one kind of account rule can include a self-imposed limitation to assist the player to responsibly use credit account(s) for wagering games. For example, referring briefly back to FIG. 9, the source account 908 can list a credit account that the player can select and use to pull money from for quickly augmenting funds in a wagering game account. Returning back to FIG. 14, for example, an account rule can include an instruction (e.g., a trigger) to determine when the player activates the Quick Add button 1420 from the wagering game machine 1462. During the process of transacting money from a source credit account, the account rule can determine whether the player has exceeded a transaction limit amount ("use limit"). The player can set the limitations of the use limit, such as by specifying a limit amount and a limit period (e.g., a daily use limit of $200). The player can set an action to "Lock" transactions from that source credit account, if the player has exceeded the use limit. If the use limit has been exceeded, the system 1400 can select other source credit accounts configured to work with the Quick Add procedure (e.g., if the "Visa" account is restricted or has met its use limit, then the system 1400 can look to the "Pal Pal" account). In some embodiments, the player can also set account rules that initiate a Quick Add procedure automatically, without the need to select a Quick Add button 1420. For example, the player can set an account rule with a trigger that watches when the wagering game session credit balance has dropped below a specified number of credits, or when a wager is placed that exceeds the credit balance. If so, then the trigger initiates an action to initiate an electronic funds transfer from the credit account to the wagering game session account. The system 1400, however, can still check for use limitations on the credit account before performing the electronic funds transfer.

If there are limitations, the system 1400 can generate a message 1412 to notify the player of restraints, use limits, etc. The system 1400 can deactivate the Quick Add procedure and/or controls associated with the wagering game machine 1462 when all accounts are restricted. In some embodiments, the player can set account rules with triggers that warn the player when the credit account is near its use limits (e.g., the system 1400 can generate a warning message that the Visa account is near a daily cash withdrawal limit, or that the wagering game machine 1462 is near a daily funds transfer limit).

In some embodiments, the system 1400 can determine a co-account manager (e.g., a co-account holder who has a credit account profile, a social contact who has a player account, etc.) associated with the account (e.g., that the player has specified in the profile, that the credit lender has on the credit account records, etc.) The co-account manager can also set limitations on the credit account. The system 1400 can detect profile settings for the co-account manager. The co-account manager can also have a player account on the account server 1404. The profile settings can include limitations on the player's use of the credit account(s). For example, if the co-account manager is a co-account holder for one of the credit accounts, the system 1400 can look at the co-account manager's account profile to determine if the co-account manager has set use limits or restraints on using that credit account for wagering game purposes. In another example, the player account 1403 can be associated with a social network account, and the co-account manager can be a social contact (e.g., a trusted friend, a money manager, a social worker, etc.) on the social network. The player can use the system 1400 to designate the social contact (e.g., within the account settings panel 1419), as an authorized agent to help the player to gamble more responsibly by giving the social contact the ability to set limitations for the player. The social contact can have an account (e.g., a social network account, a financial account, a player account, etc.) that the system 1400 can access. The system 1400 can look at the social contact's account for any limitations that the social contact has set on the use of the credit account(s) they are authorized to co-manage. In some embodiments, the co-account manager can set limitations by creating account rules which include actions that limit the use of the credit account.

FIG. 15 is a flow diagram illustrating determining limitations on credit accounts for augmenting a wagering game session account, according to some embodiments. The description for FIG. 15 will refer to some previous illustrations, such as FIGS. 9, 13, and 14. In FIG. 15, the flow 1500 begins at processing block 1502, where a wagering game system ("system") detects activation of a Quick Add procedure. The Quick Add procedure can be a single-selection Quick Add procedure. A single selection Quick Add procedure can be initiated by a single activity or event (e.g., a single click of a control, a single touch of a button, a single trigger, etc.) The system completes the rest of the operations, without additional player intervention, to transact an electronic account transaction, such as from a credit account, into the wagering game session account. FIG. 13 illustrates one example of a graphical user interface 1308 that can activate a single selection Quick Add procedure with a single touch of the with a Quick Add button 1328. FIG. 5A illustrates another example. In FIG. 5A, the icons 506, 508, 510, 512 can be "single-selection" Quick Add icons that can automatically augment a wagering game session balance with a single a touch. The system can take a default amount of funds from the accounts associated with the icons 506, 508, 510, 512. One of those icons 506, 508, 510, 512, or others not shown, can relate to electronic accounts, such as a credit account, that can be monitored and restricted according to limitation rules.

The flow 1500 continues at processing block 1504, where the system determines a credit account, and credit account access information, associated with the Quick Add procedure. The system can determine the credit account, in one embodiment, as described in FIG. 13, by utilizing an account controller. In other embodiments, the system can utilize wagering game servers (e.g., see FIG. 3), account servers (e.g., see FIG. 14), and other devices in conjunction with an account controller. The system can determine the credit account access information by reading from a player account on a wagering game network (e.g., see FIG. 14). In some embodiments, the system is configured to store the credit account access information in the player account so that the player can avoid having to input credit card information at a wagering game machine and enter account information while playing a wagering game. Nevertheless, in some embodiments, the system can obtain the credit account access information from a card swipe at a wagering game machine, or other similar ways. For example, a wagering game machine can be configured with a Quick Add reader (e.g., magnetic card reader, a touch pad, etc.) to which a player can touch or couple a personal storage device (e.g., an RFID card, a laptop, a cell phone, etc.) that can remotely transfer information to the Quick Add reader. The Quick Add reader can pull the credit account access information from the personal storage device. The Quick Add reader can have a default transaction amount associated within it, which the system can use, as described in processing block 1506.

The flow 1500 continues at processing block 1506, where the system determines a transaction amount to transfer from the credit account to the wagering game session account. The system can determine a transaction amount to transfer by searching a player profile to determine a default transaction amount, as illustrated in FIG. 14. In other embodiments, the system can use a default system amount, not a player indicated amount. For instance, a wagering game machine can store a default transaction amount associated with a Quick Add mechanism. When the Quick Add mechanism is initiated, the system can look at the stored default transaction amount on the wagering game machine. In other embodiments, the player can indicate the transaction amount as part of an interview at the beginning of a wagering game session. In other embodiments, the system can prompt the player to select a specific transaction amount after the player initiates the Quick Add procedure. For example, in FIG. 5B, any of the icons 506, 508, 510, 512 can be Quick Add icons that initiate a Quick Add procedure when selected, but then prompt the player for a specific transaction amount. When the player first selects one of the icons 506, 508, 510, 512, the system can display the denomination icons 514. Each denomination icon 514 can be associated with a pre-determined money value equivalent in value to the denomination amount show on the icons 514. When the player selects a specific denomination icon 514, the system can use the denomination amount to deduct from the accounts associated with the icons 506, 508, 510, 512, or from other accounts, such as from a credit account.

The flow 1500 continues at processing block 1508, where the system determines limitations on use of the credit account to augment the wagering game session account. The system can access rules stores as illustrated in FIG. 13. In some embodiments, the system can access private and public databases over a communications network, like the Internet, to determine whether the wagering game player is restrained, or prohibited, from using the credit account for wagering game purposes. The limitations can also be use limits set by the player, by the casino, by third parties, or others, that have been authorized to limit the amount of funds that can be transacted from the credit account during a specified period of time, by a specific player, etc.

The flow 1500 continues at decisional block 1510, where the system determines whether there are use limitations. If there are use limitations, the flow 400 continues at block 1602 in FIG. 16, to determine how to enforce the use limitations. If there are no use limitations, the flow 1500 continues at processing block 1512, where the system transfers the transaction amount from the credit account to the wagering game session account. In some embodiments, the system can access the credit account for the transfer, as illustrated in FIG. 13. In other embodiments, the system can transfer funds from the credit account to a wagering account that is separate from the wagering game session account, and then subsequently transfer the funds to the wagering game session account, or vice versa. In yet other embodiments, instead of accessing the credit account after a Quick Add procedure is activated, the system can access a holding account that has been pre-loaded with funds from the credit account, like described in some embodiments of FIG. 14 above.

FIG. 16 is a flow diagram illustrating controlling use limitations, according to some embodiments. In FIG. 16, the flow 1600 begins at processing block 1602, where a wagering game system ("system") determines whether there are use restrictions on a credit account. The system can determine various types of limitations. Some limitations can be restrictions, or prohibitions, that stop, or prevent the use of the credit account. The restrictions can be set by the player, social contacts (e.g., friends, family, financial managers, etc.), social groups (e.g., Gamblers Anonymous), jurisdictional bodies (e.g., a gaming commission), business groups (e.g., a casino, a credit card company, etc.), governing bodies (e.g., courts, law enforcement, Immigration Department, etc.), or any other individual, organization, or entity, that has an interest in keeping the player from using a credit account for wagering games. For example, some groups may know of the player's problems with gambling, money management, criminal background, debts, erratic financial status, arrears in child support, warrants, illegal immigration status, under age status, bankruptcy status, etc. Those third parties may have an interest in helping the player control spending on wagering games. Since credit accounts can be monitored and restricted electronically, the system can check for restrictions by the third parties by (a) looking at accounts, online watch lists, membership lists, court records, law enforcement databases, etc., that belong to the third parties to find the player's name and/or other identifying information (e.g., social security number, aliases, etc.), and (b) looking for limitation rules associated with the player In processing block 1603, after finding the player's name and/or other identifying information from potential sources, the system can stop the transaction, and provide a message explaining the reason(s) for the use restriction(s). The system can present the message through a GUI as a pop-up message (e.g., see message 1412 in FIG. 14). For future reference, the system can store the player's name and any discovered restrictions on the player in a database record related to the player's account. In some embodiments, the system can periodically scan through sources to find the player's restricted status. For example, when a player first registers for a player account with a casino, the system can run a check to see if the player is listed on any sort of list restricting the use of credit accounts. The system can store that information for quick access, and run periodic updates to see if the restrictions have been removed.

In addition to use restrictions, or prohibitions, some limitations can be use limits, which limit, but don't automatically restrict, the player from using the credit account unless the player has reached a spending limit. At processing block 1604 the system determines if the player has reached, or exhausted, a spending limit set by the system. The limit can be a "session" limit, or in other words, a system imposed limit on credit account spending during any given wagering game session. The session limit can include an amount that can be utilized by any or all credit accounts for any wagering game session. To prevent the player from circumventing the limit by repeatedly starting game sessions, the session limit can also have a periodic time limitation, like a daily limit, wherein the player is restricted from utilizing any or all of the credit accounts for quick balance augmentation until the next day. The session balance can be stored and associated with an account server, with a wagering game machine, as a stand-alone background routine, etc. The player can use the credit account until the limit has been reached. Once reached, the system can provide a message, in processing block 1610, that notifies the player that the session limit is exhausted.

If there is no session limit, or if the session limit has not been exhausted, the system, at processing block 1606, can check for another type of limitation, a credit limit. A credit limit is a limit set on the credit account itself. The credit limit can be set by the player, as a self-imposed spending limit, by a social contact, by the credit account, or by other individuals, groups, third parties, and mechanisms. The system can look for money limits, time period limits, or a combination of the two like a daily spending limit. As mentioned previously, some use limitations can be self-imposed limits stored by the player as account rules in a player profile and/or player account settings. At processing block 1606, the system can check to see if the credit limit has been exhausted. For instance, the system can store a credit transfer balance to determine how many credit transfers have been made by the player, what the total amount of the credit transfers have been, and what times periods have transpired between credit transfers.

If the system determines that a credit limit has been exhausted, then, at processing block 1608, the system can check to see if there are other credit account(s) associated with the player account. If so, the flow 1500 can return to block 1602 and the system can check for limitations on the other credit account(s).

If, however, there are no other credit accounts, and the credit limit is exhausted, the flow 1500 continues at processing block 1610, where the system can provide a message that the credit limit is exhausted.

Returning now to processing block 1606, if the session limit and/or the credit limit have not been exhausted, the flow 1500 continues at processing block 1612, where the system determines whether the player account has not yet exceeded a use limit, but that the request for the transaction amount would exceed the use limits. For example, the system may determine that a default transaction amount, such as $100, would exceed the dollar amount of the limit, but the limit still has some balance left, such as $25. At processing block 1614, the system can provide a message that the limit would be exceeded if the default transaction amount were transferred (e.g., if the system were to transfer $100), but the system can still transfer up to the use limit (i.e., the $25 amount up to the limit). In some embodiments, the system can provide a message and prompt the player whether the player wants to transfer the remainder (i.e., the $25 amount). In some embodiments, the system can transfer the remainder automatically.

Returning now to processing block 1612, if there are no use restrictions, and if the use limits are not exhausted, or would not be exceeded with the transaction, the flow returns to block 1512 in FIG. 15, where the system transfers the transaction amount from the credit account to the wagering game session account. The system can then store the transaction amount in a memory store (e.g., in the credit transfer balance) that the system uses to track how much money has been transferred within the use limit. The system can coordinate any transaction fees, or other costs associated with the credit account transaction, as well as the wagering game session balance, the player account balance, or other balances necessary to track the funds transfers.

General

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

The invention claimed is:

1. A method comprising:
    assigning one or more money values to a graphical user interface control;
    linking the graphical user interface control to a credit account, wherein the credit account is a third-party financial account from which a player account is authorized to borrow funds up to a credit limit; and
    providing, via at least one of one or more processors, the graphical user interface control for presentation during a wagering game session associated with the player account.

2. The method of claim 1 further comprising:
    detecting an activation of the graphical user interface control via user input during the wagering game session; and
    in response to the detecting the activation of the graphical user interface control, requesting a transfer, from the credit account to the player account, of an amount of money equal to at least one of the one or more money values.

3. The method of claim 2, wherein the one or more money values are less than an amount of the credit limit.

4. The method of claim 1 further comprising:
    detecting an additional activation of the graphical user interface control via additional user input during the wagering game session; and
    in response to the detecting the additional activation of the graphical user interface control, requesting a transfer, from the player account to the credit account, of an amount of money equal to at least one of the one or more money values.

5. The method of claim 4 further comprising:
    detecting that an amount of losses during the wagering game session exceeds a loss limit; and
    automatically restricting the transfer, between the credit account and the player account, of the amount of money equal to the at least one of the one or more money values.

6. The method of claim 4, wherein the one or more values are assigned to one or more graphics, and further comprising detecting a drag and drop of one of the one or more graphics to a credit meter for the wagering game session.

7. The method of claim 1 further comprising:
    transferring, from the player account to the credit account, a percentage of winnings attained from the wagering game session.

8. The method of claim 1 further comprising:
    detecting a user input indicating the one or more money values to assign to the graphical user interface control.

9. A system comprising:
one or more processors;
one or more memory units configured to store instructions, which when executed by at least one of the one or more processors, cause the system to perform operations to
assign one or more money values to a graphical user interface control,
link the graphical user interface control to a credit account, wherein the credit account is a third-party financial account from which a player account is authorized to borrow funds up to a credit limit, and
provide the graphical user interface control for presentation during a wagering game session associated with the player account.

10. The system of claim 9, wherein the one or more memory units are configured to store instructions, which when executed by at least one of the one or more processors, cause the system to further perform operations to:
detect an activation of the graphical user interface control via user input during the wagering game session; and
in response to the activation of the graphical user interface control, request a transfer, from the credit account to the player account, of an amount of money equal to at least one of the one or more money values.

11. The system of claim 10, wherein the one or more memory units are configured to store instructions, which when executed by at least one of the one or more processors, cause the system to further perform operations to:
detect that an amount of losses during the wagering game session exceeds a loss limit; and
automatically restrict the transfer, between the credit account and the player account, of the amount of money equal to the at least one of the one or more money values.

12. The system of claim 9, wherein the one or more money values are less than an amount of the credit limit.

13. The system of claim 9, wherein the one or more memory units are configured to store instructions, which when executed by at least one of the one or more processors, cause the system to further perform operations to:
detect an activation of the graphical user interface control via user input during the wagering game session; and
in response to the activation of the graphical user interface control, request a transfer, from the player account to the credit account, of an amount of money equal to at least one of the one or more money values.

14. The system of claim 9, wherein the one or more memory units are configured to store instructions, which when executed by at least one of the one or more processors, cause the system to further perform operations to:
transfer, from the player account to the credit account, a percentage of winnings attained from the wagering game session.

15. The system of claim 9, wherein the one or more memory units are configured to store instructions, which when executed by at least one of the one or more processors, cause the system to further perform operations to:
detect a user input indicating the one or more money values to assign to the graphical user interface control.

16. One or more non-transitory, machine-readable storage media having instructions stored thereon, which when executed by a set of one or more processors cause the set of one or more processors to perform operations comprising:
assigning one or more money values to a graphical user interface control;
linking the graphical user interface control to a credit account, wherein the credit account is a third-party financial account from which a player account is authorized to borrow funds up to a credit limit;
providing the graphical user interface control for presentation during a wagering game session associated with the player account;
detecting an activation of the graphical user interface control via user input during the wagering game session; and
in response to the activation of the graphical user interface control, requesting a transfer, between the credit account and the player account, of an amount of money equal to at least one of the one or more money values.

17. The one or more non-transitory, machine-readable storage media of claim 16, wherein the one or more money values are less than an amount of the credit limit.

18. The one or more non-transitory, machine-readable storage media of claim 16, wherein the operations further include:
transferring, from the player account to the credit account, a percentage of winnings attained from the wagering game session.

19. The one or more non-transitory, machine-readable storage media of claim 16, wherein the operations further include:
detecting a user input indicating the one or more money values to assign to the graphical user interface control.

20. The one or more non-transitory, machine-readable storage media of claim 16, wherein the operations further include:
detecting that an amount of losses during the wagering game session exceeds a loss limit; and
automatically restricting the transfer, between the credit account and the player account, of the amount of money equal to the at least one of the one or more money values.

* * * * *